US010713795B2

(12) United States Patent
Konstantinov

(10) Patent No.: US 10,713,795 B2
(45) Date of Patent: Jul. 14, 2020

(54) METHOD AND ELECTRONIC DEVICE FOR GENERATING AN INDEX OF SEGMENTS OF POLYGONS

(71) Applicant: YANDEX EUROPE AG, Lucerne (CH)

(72) Inventor: Sergey Sergeevich Konstantinov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 78 days.

(21) Appl. No.: 16/251,345

(22) Filed: Jan. 18, 2019

(65) Prior Publication Data

US 2020/0013167 A1 Jan. 9, 2020

(30) Foreign Application Priority Data

Jul. 4, 2018 (RU) .................................. 2018124478

(51) Int. Cl.
*G06T 7/11* (2017.01)
*G06T 17/05* (2011.01)
(Continued)

(52) U.S. Cl.
CPC ................ *G06T 7/11* (2017.01); *G06T 15/06* (2013.01); *G06T 17/05* (2013.01); *G06T 17/20* (2013.01);
(Continued)

(58) Field of Classification Search
CPC . G06T 15/06; G06T 7/11; G06T 17/20; G06T 17/05; G06T 2207/20164; G06T 2210/21
(Continued)

(56) References Cited

U.S. PATENT DOCUMENTS 6,308,177 B1 10/2001 Israni et al.
6,625,611 B1 9/2003 Teig et al.
(Continued)

FOREIGN PATENT DOCUMENTS

RU 2011114094 A 1/2013

OTHER PUBLICATIONS

Russian Search Report dated Dec. 12, 2019 issued in respect of the corresponding Russian Patent Application No. RU2018124478.
(Continued)

*Primary Examiner* — Congvan Tran
(74) *Attorney, Agent, or Firm* — BCF LLP

(57) ABSTRACT

A method and electronic device for generating an index of segments of a polygon is disclosed. The method comprises segmenting a reference zone, which covers at least a portion of a map enclosing all segments of the polygon, into first level zones. Responsive to at least one segment being at least partially located within more than one first level zones, the method comprises indexing the at least one segment in association with the reference zone. The method also comprises, until a terminal condition is met, iteratively: (i) segmenting a given zone into subsequent level zones, where the given zone is a parent zone to the subsequent level zones, and (ii) responsive to at least one other segment being at least partially located within more than one subsequent level zones, indexing the at least one other segment in association with the given zone.

20 Claims, 9 Drawing Sheets

(51) Int. Cl.
*G06T 17/20* (2006.01)
*G06T 15/06* (2011.01)

(52) U.S. Cl.
CPC ............... *G06T 2207/20164* (2013.01); *G06T 2210/21* (2013.01)

(58) Field of Classification Search
USPC .................................. 382/173, 178, 224, 254
See application file for complete search history.

(56) References Cited

U.S. PATENT DOCUMENTS

| | | | | |
|---|---|---|---|---|
| 7,197,500 | B1* | 3/2007 | Israni | G01C 21/32 340/995.14 |
| 7,561,888 | B2 | 7/2009 | Jennings | |
| 9,721,363 | B2* | 8/2017 | Williams | G06T 17/20 |
| 9,753,965 | B2 | 9/2017 | Rana et al. | |
| 2003/0217074 | A1 | 11/2003 | Wallace | |
| 2007/0185649 | A1 | 8/2007 | Geilich | |
| 2010/0183225 | A1* | 7/2010 | Vantaram | G06T 7/155 382/173 |
| 2011/0145228 | A1 | 6/2011 | Laurenzo et al. | |
| 2013/0238632 | A1 | 9/2013 | Urquhart | |
| 2016/0203522 | A1 | 7/2016 | Shiffert et al. | |
| 2016/0378848 | A1 | 12/2016 | Basovnik et al. | |
| 2017/0303106 | A1* | 10/2017 | Kannan | G06N 5/02 |
| 2019/0087840 | A1* | 3/2019 | Zachariah | G09B 29/106 |

OTHER PUBLICATIONS

Vikram Singla, "Finding Nearest Location with Open Box Query using Geohashing and MapReduce"; Computer science and engineering department, Thapar University, Patiala—147004, Jul. 2013 http://gdeepak.com/thesisme/Finding%20Nearest%20Location%20with%20open%20box%20query.pdf.

* cited by examiner

METHOD AND ELECTRONIC DEVICE FOR GENERATING AN INDEX OF SEGMENTS OF POLYGONS

CROSS-REFERENCE

The present application claims priority to Russian Patent Application No. 2018124478, filed on Jul. 4, 2018, entitled "Method and Electronic Device for Generating an Index of Segments of Polygons," the entirety of which is incorporated herein by reference.

FIELD

The present technology relates to map data processing in general and, specifically, to a method and apparatus for generating an index of segments of polygons.

BACKGROUND

The Point In Polygon (PIP) problem has important implications in a variety of disciplines, including geographic positioning systems (GPS), computer games, computer vision applications, mapping applications, computer-aided designs (CAD) and others. Some solutions of the PIP problem have been motivated by the requirements of determining a relative location of a given user device with respect to a geographical region or area.

For example, it might be useful to determine whether a given user of a device is located inside or outside a given area of interest (AOI) such as, for example, a city, a park, a festival venue and the like. In this example, the digitized boundaries of the given AOI may contain hundreds of thousands of points. Hence, application of a "brute force" validation technique for determining whether the location of the device is within the boundaries of the AOI in order to solve the PIP problem involves a large number of comparisons of the location of the device against all of the many segments of a polygon representing the boundary of the given AOI. While some performance optimizations exist for solving the PIP problem, in general such optimizations are still resource intensive or impractical. Consequently, validating the relative location of data points against a large boundary is computationally expensive.

Therefore, improvements to solutions of the PIP problem may be desirable.

SUMMARY

Developers of the present technology have appreciated certain technical drawbacks associated with the existing solutions of the Point In Polygon (PIP) problem. It is an object of the present technology to ameliorate at least some of the inconveniences present in the prior art.

The developers of the present technology have devised methods and electronic devices for improving the speed of determining whether a given point is located inside or outside a given polygon. More particularly, the developers have devised a way of indexing segments of the given polygon such that only some of a totality of segments of the given polygon need to be retrieved for comparison against a ray projecting from the given point in order to determine whether the given point is inside or outside the given polygon.

It is contemplated that by reducing the number of segments that need to be compared against the ray, the present methods and electronic devices allow reducing the amount of processing resources required to execute the comparisons, if compared to comparisons of the totality of segments of the given polygon against the ray. As a result, the comparisons may be executed faster and thus the determination of a relative location of the given point with respect to the given polygon may be performed quicker.

The developers of the present technology have devised a method of building an index of segments of the polygon where the index is in a form of a tree-structure. In some embodiments, the developers have devised a building process of the index where the size of the tree-structure can be controlled. This control over the size of the tree-structure may allow generating a tree-structure of a desired size that is suitable for efficient look-up and retrieval operations by a electronic device having physically limited amount of processing resources. Indeed, the size of the tree-structure can be controlled so that the available amount of processing resources for look-up and retrieval operations is sufficient for a desired speed of look-up and retrieval operations.

In a first broad aspect of the present technology, there is disclosed a method of generating an index of segments of at least one polygon defining a boundary of a respective geographic area on a map. The method is executable by an electronic device. The electronic device has access to a database for hosting the index. The method comprises segmenting, by the electronic device, a reference zone at a reference level into first level zones at a first level. The reference zone covers at least a portion of the map which encloses all segments of the at least one polygon. The reference zone is a parent zone to the first level zones. The method comprises, responsive to at least one segment being at least partially located within more than one first level zones, indexing, by the electronic device, the at least one segment in association with the reference zone. The indexing comprises storing, by the electronic device, data about the at least one segment in association with the reference zone, such that segments located within only one first level zone are indexed in association with zones other than the reference zone. The method comprises, until a terminal condition is met, iteratively: (i) segmenting, by the electronic device, a given zone at a given level into subsequent level zones at a subsequent level where the given zone being a parent zone to the respective subsequent level zones; and (ii) responsive to at least one other segment being at least partially located within more than one respective subsequent level zones, indexing, by the electronic device, the at least one other segment in association with the given zone. The indexing comprises: generating, by the electronic device, a geo-marker for the given zone where the geo-marker being indicative of (i) a location of the given zone in a respective parent zone where the respective parent zone of the given zone is at a preceding level to the given level, and (ii) a geographic association between the given zone and other child zones of the respective parent zone. The indexing also comprises storing, by the electronic device, data about the at least one other segment in association with the geo-marker of the given zone. The segments located within only one respective subsequent level zone are indexed in association with child zones of a respective one of the only one subsequent level zone.

In some implementations of the method, the electronic device is one of a server or a user device associated with a user.

In some implementations of the method, in response to the terminal condition being met, the method further comprises indexing, by the electronic device, the segments located within the only one respective subsequent level zone in association with the only one respective subsequent level zone.

In some implementations of the method, the terminal condition is met when at least one of: a number of pixels included in at least one lowest level zone is below a pre-determined minimum number of pixels to be enclosed in the at least one lowest level zone, and a number of segments located entirely in the at least one lowest level zone is below a pre-determined minimum number of segments to be located entirely in the at least one lowest level zone.

In some implementations of the method, the method further comprises receiving, by the electronic device, an indication of a location of a target point on the map. The method further comprises accessing, by the electronic device, the index to determine: a lowest level target zone corresponding to the location of the target point based on geo-markers of zones in the index, and other target zones being (i) at least partially located along a pre-determined direction on the map from the lowest level target zone and (ii) at least partially aligned with the lowest level target zone in the pre-determined direction, based on the geo-markers of zones stored in the index. The pre-determined direction has been determined based on a geographic association between child zones of a given parent zone. The lowest level target zone and the other target zones form a set of target zones associated with the target point and the pre-determined direction on the map.

In some implementations of the method, the accessing the index to determine the other target zones comprises executing, by the electronic device, a masking algorithm on the geo-markers of zones stored in the index. The masking algorithm has been configured (i) based on the geographic association between child zones of a given parent zone and (ii) for determining whether a given zone is at least partially located from another given zone in the pre-determined direction and whether the given zone is at least partially aligned with the another given zone in the pre-determined direction based on geo-markers of the given zone and the another given zone.

In some implementations of the method, the method further comprises determining, by the electronic device, whether the target point is within a given geographic area. The boundary of the given geographic area corresponds to a given polygon from the at least one polygon. The determining comprises generating, by the electronic device, a set of target segments by grouping the data about segments that are both (i) stored in the index in association with the set of target zones and (ii) associated with the given polygon. The method further comprises geometrically determining, by the electronic device, a number of target segments in the set of target segments that intersect a ray projecting from the location of the target point along the pre-determined direction on the map. Responsive to geometrically determining that an even number of target segments intersect the ray, the method comprises determining, by the electronic device, that the target point is outside the given geographic area. Responsive to geometrically determining that an odd number of target segments intersect the ray, the method comprises determining, by the electronic device, that the target point is inside the given geographic area.

In some implementations of the method, the map is displayable on a screen connectable to an electronic device associated with a user. The receiving, by the electronic device, the indication of the location of the target point on the map comprises receiving an indication of a user interaction of a portion of the map.

In some implementations of the method, the user interaction is one of a click and touch on a touch screen.

In some implementations of the method, the generating the geo-marker comprises employing, by the electronic device, a geo-hashing algorithm.

In some implementations of the method, the employing the geo-hashing algorithm comprises employing, by the electronic device, a Z-order encoding for encoding the geographic association for the respective zone.

In a second broad aspect of the present technology, there is disclosed an electronic device for generating an index of segments of at least one polygon defining a boundary of a respective geographic area on a map. The electronic device has access to a database for hosting the index. The electronic device is configured to segment a reference zone at a reference level into first level zones at a first level. The reference zone covers at least a portion of the map which encloses all segments of the at least one polygon. The reference zone is a parent zone to the first level zones. The electronic device is configured to responsive to at least one segment being at least partially located within more than one first level zones, index the at least one segment in association with the reference zone. The electronic device configured to index comprises the electronic device configured to store data about the at least one segment in association with the reference zone. The segments located within only one first level zone are indexed in association with zones other than the reference zone. The electronic device is configured to until a terminal condition is met, iteratively: (i) segment a given zone at a given level into subsequent level zones at a subsequent level where the given zone is a parent zone to the respective subsequent level zones and (ii) responsive to at least one other segment being at least partially located within more than one respective subsequent level zones, index the at least one other segment in association with the given zone. The electronic device configured to index comprises the electronic device configured to generate a geo-marker for the given zone where the geo-marker is indicative of (i) a location of the given zone in a respective parent zone where the respective parent zone of the given zone is at a preceding level to the given level, and (ii) a geographic association between the given zone and other child zones of the respective parent zone. The electronic device configured to index comprises the electronic device configured to store data about the at least one other segment in association with the geo-marker of the given zone. The segments located within only one respective subsequent level zone are indexed in association with child zones of a respective one of the only one subsequent level zone.

In some implementations of the electronic device, the electronic device is one of a server and a user device associated with a user.

In some implementations of the electronic device, in response to the terminal condition being met, the electronic device is further configured to index the segments located within the only one respective subsequent level zone in association with the only one respective subsequent level zone.

In some implementations of the electronic device, the terminal condition is met when at least one of: a number of pixels included in at least one lowest level zone is below a pre-determined minimum number of pixels to be enclosed in the at least one lowest level zone, and a number of segments located entirely in the at least one lowest level zone is below a pre-determined minimum number of segments to be located entirely in the at least one lowest level zone.

In some implementations of the electronic device, the electronic device is further configured to: receive an indication of a location of a target point on the map; access the index to determine: a lowest level target zone corresponding to the location of the target point based on geo-markers of zones in the index; and other target zones that are (i) at least partially located along a pre-determined direction on the map from the lowest level target zone and (ii) at least partially aligned with the lowest level target zone in the pre-determined direction, based on the geo-markers of zones stored in the index. The pre-determined direction has been determined based on a geographic association between child zones of a given parent zone. The lowest level target zone and the other target zones form a set of target zones associated with the target point and the pre-determined direction on the map.

In some implementations of the electronic device, to access the index to determine the other target zones comprises the electronic device being configured to execute a masking algorithm on the geo-markers of zones stored in the index. The masking algorithm has been configured: (i) based on the geographic association between child zones of a given parent zone, and (ii) for determining whether a given zone is at least partially located from another given zone in the pre-determined direction and whether the given zone is at least partially aligned with the another given zone in the pre-determined direction, based on geo-markers of the given zone and the another given zone.

In some implementations of the electronic device, the electronic device is further configured to: determine whether the target point is within a given geographic area. The boundary of the given geographic area corresponds to a given polygon from the at least one polygon. To determine whether the target point is within a given geographic area comprises the electronic device configured to generate a set of target segments by grouping the data about segments that are both stored in the index in association with the set of target zones and associated with the given polygon. To determine whether the target point is within a given geographic area comprises the electronic device configured to geometrically determine a number of target segments in the set of target segments that intersect a ray projecting from the location of the target point along the pre-determined direction on the map. Responsive to geometrically determining that an even number of target segments intersect the ray, the electronic device is configured to determine that the target point is outside the given geographic area. Responsive to geometrically determining that an odd number of target segments intersect the ray, the electronic device is configured to determine that the target point is inside the given geographic area.

In some implementations of the electronic device, the map is displayable on a screen connectable to the electronic device. The electronic device configured to receive the indication of the location of the target point on the map comprises the electronic device configured to receive an indication of a user interaction of a portion of the map.

In some implementations of the electronic device, the user interaction is one of a click and touch on a touch screen.

In some implementations of the electronic device, to generate the geo-marker comprises the electronic device being configured to employ a geo-hashing algorithm.

In some implementations of the electronic device, to employ the geo-hashing algorithm comprises the electronic device being configured to employ a Z-order encoding for encoding the geographic association for the respective zone.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
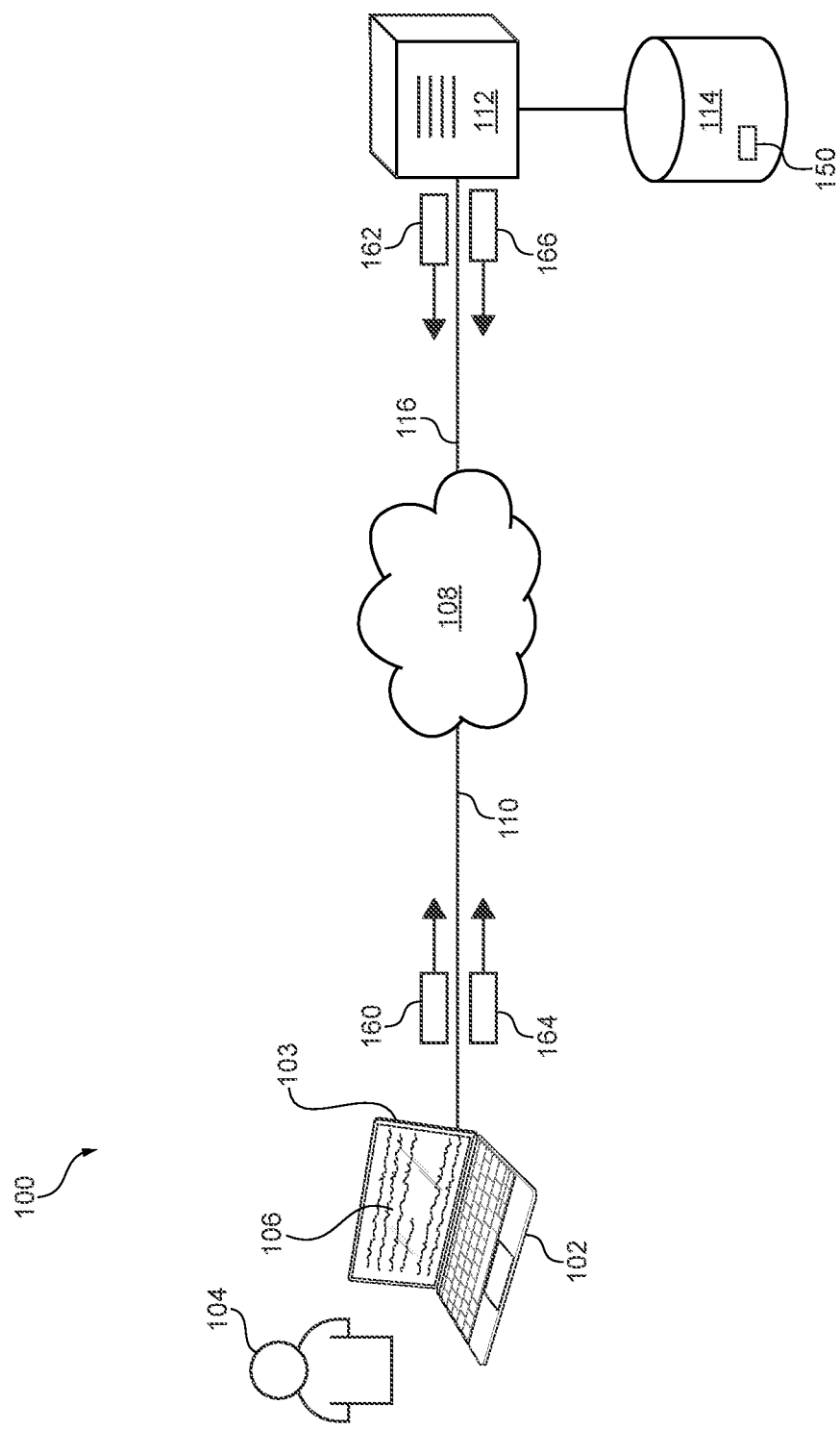
FIG. 1 depicts a system suitable for implementing non-limiting embodiments of the present technology.

Referring to FIG. 1, there is shown a schematic diagram of a system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a client device 102. The client device 102 is typically associated with a user 104 and, as such, can be referred herein below as a client device 102. It should be noted that the fact that the client device 102 is associated with the user 104 does not need to suggest or imply any mode of operation, such as a need to log in, a need to be registered or the like The implementation of the client device 102 is not particularly limited, but as an example, the client device 102 may be implemented as a personal computer (desktop (as shown), laptop, netbook, etc.), and a wireless communication device (a cell phone, a smartphone, a tablet and the like). The client device 102 comprises several hardware components, including but not limited to a processor (not depicted) and a memory (not depicted), which memory can have several components (including cache and the like).

The client device 102 comprises hardware and software and/or firmware (or a combination thereof) for executing an map application 106, and where the map application 106 is for inter alia accessing or otherwise displaying a map.

The map application 106 can be, but not limited to, a dedicated map application, such as the Yandex.Maps™ application for mobile devices, a web browser, or any other application being configured to provide one or more map images. The map application 106 can also be implemented as an image capturing/editing application, as a 3D game application and the like. Therefore, broadly speaking, the map application 106 may be a given application configured to render and cause display of one or more images without departing from the scope of the present technology.

The client device 102 is coupled to a communication network 108 via a communication link 110. In some non-limiting embodiments of the present technology, the communication network 108 can be implemented as the Internet. In other embodiments of the present technology, the communication network 108 can be implemented differently, such as any wide-area communication network, local-area communication network, a private communication network and the like.

How the communication link 110 is implemented is not particularly limited and will depend on how the client device 102 is implemented. Merely as an example and not as a limitation, in those embodiments of the present technology where the client device 102 is implemented as a wireless communication device (such as a smart-phone), the communication link 110 can be implemented as a wireless communication link (such as but not limited to, a 3G communication network link, a 4G communication network link, a Wireless Fidelity, or WiFi® for short, Bluetooth® and the like). In those examples, where the client device 102 is implemented as a notebook computer, the communication link can be either wireless (such as WiFi®, Bluetooth® or the like) or wired (such as an Ethernet based connection).

General implementation of the client device 102 is known. It should, however, be mentioned that the client device 102 comprises an output device 103. The output device 103 is configured to present visual information to the user 104. The visual information can be text, images, videos and the like. In particular, the output device 103 is configured to display output of the map application 106. The output device 103 can be implemented as a monitor, a built-in display, a touch screen, and the like.

It should be expressly understood that implementations for the client device 102, the communication link 110 and the communication network 108 are provided for illustration purposes only. As such, those skilled in the art will easily appreciate other specific details for implementing the client device 102, the communication link 110 and the communication network 108. As such, by no means, examples provided herein above are meant to limit the scope of the present technology.

Also coupled to the communication network is a server 112. The server 112 can be implemented as a conventional computer server. In an example of an embodiment of the present technology, the server 112 can be implemented as a Dell™ PowerEdge™ Server running the Microsoft™ Windows Server™ operating system. It is contemplated that the server 112 can be implemented in any other suitable hardware and/or software and/or firmware or a combination thereof. In the depicted non-limiting embodiment of present technology, the server 112 is a single server. In alternative non-limiting embodiments of the present technology, the functionality of the server 112 may be distributed and may be implemented via multiple servers.

The implementation of the server 112 is well known to the person skilled in the art of the present technology. However, briefly speaking, the server 112 comprises a communication interface (not depicted) structured and configured to communicate with various entities (such as the client device 102, for example) via the communication network 108. The server 112 further comprises at least one computer processor (not depicted) operationally connected with the communication interface and structured and configured to execute various processes to be described herein.

The server 112 is coupled to the communication network 108 via a communication link 116. How the communication link 116 is implemented is not particularly limited and will depend on how the server 112 is implemented. It is contemplated that the examples of implementations of the communication link 110 provided above could be applied to the communication link 116.

Generally speaking, the server 112 is configured to: receive, via the communication network 108 and communication links 110, 116, from the client device 102 a request 160 for displaying a given map representation; (ii) retrieve image data (such as one or more image tiles) required for generating the requested map representation, (iii) send a response 162 containing the retrieved image data to the client device 102, via the communication network 108 and communication links 110, 116, (iv) receive from the client device 102 an indication 164 of a location of a given target point (for example, selected by the user 104), (v) determine whether the target point is inside a given geographic area and (vi) optionally, responsive to the target point being inside the given geographic area, send a response 166 containing region-specific data to the client device 102, via the communication network 108 and communication links 110, 116. How the server 112 is configured to execute at least some of the above non-exhaustively listed functions of the server 112 will be discussed in greater detail below.

The server 112 has access to a database 114. Generally speaking, the database 114 is configured to store inter alia (i) data required to render one or more map images and (ii) index(es) of geographic area boundaries. In the depicted non-limiting embodiment of present technology, the database 114 is a single database. In alternative non-limiting embodiments of the present technology, the functionality of the database 114 may be distributed and may be implemented via multiple databases.

How the database 114 maintains image data for rendering one or more map images is not particularly limiting but, just an example, the database 114 may be configured to store image data for displaying different map representations of a map at different zoom levels. It should be understood that the nature of map images (image data) forming different map representations which are stored by the server 112 is not particularly limited. For example, in order to render a particular map representation at a particular zoom level, the database 112 may store a dedicated plurality of map images for that particular zoom level, also known as "map tiles", which when combined form the particular map representation. Naturally, the image data may be implemented in several different ways and may depend on inter alia various implementations of the present technology.

As mentioned above, the database 114 may store index (es) of boundaries of geographic areas. For example, the database 114 may store an index 150 associated with a boundary of at least one geographic area. In some embodiments, a given geographic area may correspond to a given Area Of Interest (AOI) on a map. Some non-limiting examples of AOIs are: a park, a monument, a mountain, a hiking trail, a festival location, a city, a parking lot, a lake, a road, a country, a continent, a football field, an airport, and the like.

Generally speaking, the index 150 is a data structure that is designed to improve speed of look-up and/or data retrieval operations from the database 114. The index 150 may be used by the server 112 in order to quickly locate data in the database 114 associated with one or more geographic areas, when the database 114 is accessed by the server 112 for data retrieval. It is contemplated that in some embodiments, building and/or maintaining the index 150 may come at a cost of additional memory space in the database 114, but may result in an increased speed of look-up and/or data retrieval operations from the database 114 if compared to a speed of look-up and/or data retrieval operations from the database 114 where data associated with the one or more geographic areas is not stored in an indexed format.

As it will be described in greater detail below, the server 112 may be configured to store the index 150 in the database 112 for future use, such as, for example, for determining whether a given target point (selected by the user 104, for example) is inside or otherwise outside the one or more respective geographic areas associated with the index 150.

In some embodiments, the index 150 may be built and/or maintained by the server 112 by populating one or more database records of the database 114. In other embodiments, the index 150 may be built and/or maintained by the server 112 in a form of a tree-structure 700 as visually illustrated in FIG. 7. Basically, the tree-structure 700 comprises a number of nodes at different levels of the tree-structure 700 and where each node of the tree-structure 700 is associated with, generally speaking, some information about the one or more respective geographic areas. Building process of the index 150 by the server 112 will be described in greater detail below.

Figure 2:
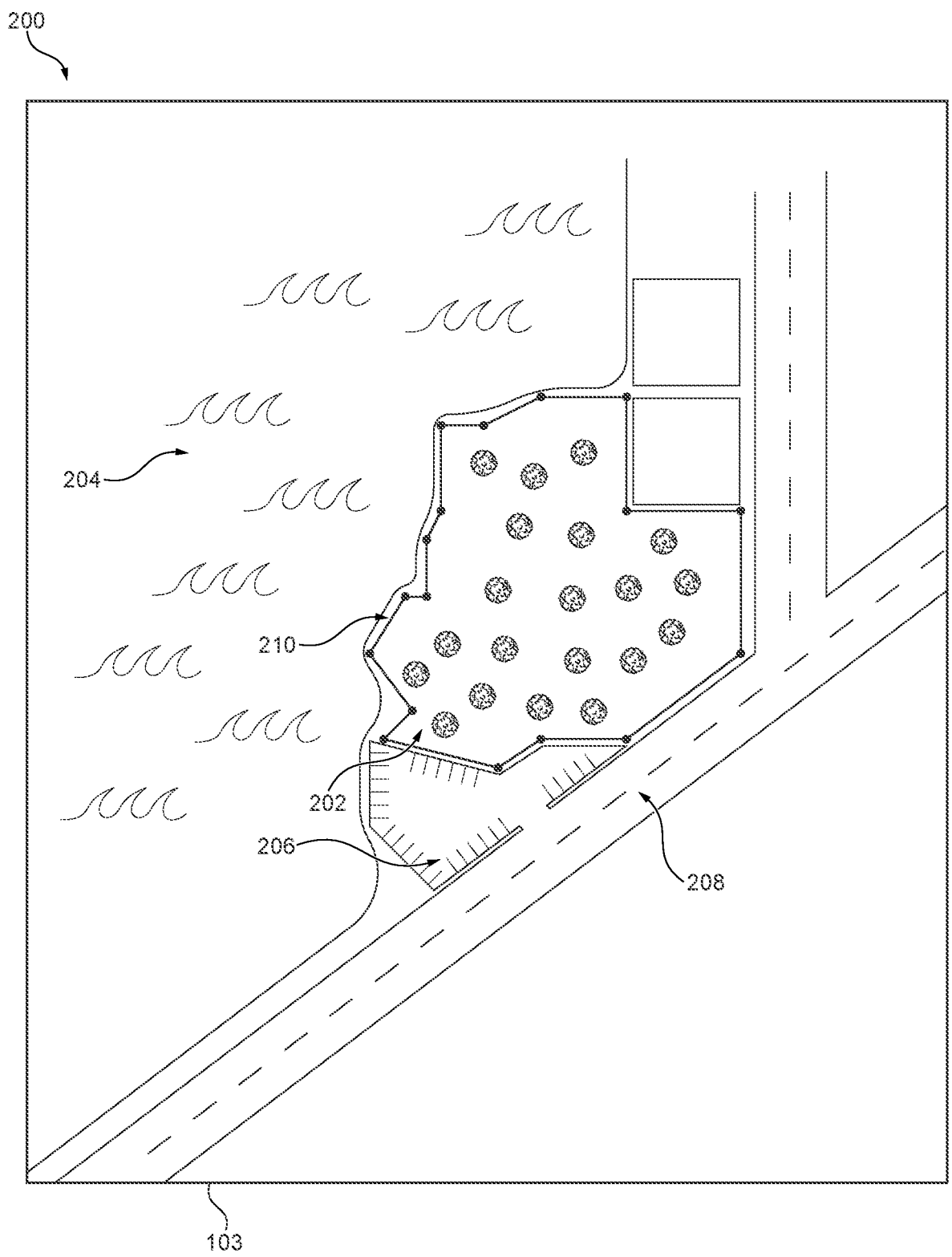
FIG. 2 depicts a map representation of a map displayed by an electronic device of the system of FIG. 1, in accordance with some embodiments of the present technology.

With reference to FIG. 2, there is depicted a map representation 200 being at least a portion of a map at a given zoom level. For example, the map representation 200 may be displayed to the user 104 via the output device 103 following a transmission of the response 162 by the server 112 to the device 104, in response to the request 160 from the device 104. The map representation 200 generally shows a park 202, a lake 204, a parking lot 206 and a road 208. As previously mentioned, the map representation 200 may be formed from a dedicated plurality of map images stored in the database 114 and which may be retrieved by the server 112 following the receipt of the request 160 from the device 104.

It should be mentioned that the park 202 is a given geographic area seen on the map representation 200 of the map and which is delimited or defined by a boundary 210 generally corresponding to the perimeter of the park 202 on the map. For example, if the user 104 uses a cursor or any other suitable means for "hovering over" the park 202, the boundary 210 may be, optionally, visually displayed by the map application 106 in a distinctive manner to, in a sense, "highlight" the perimeter of the park 202 on the map.

It should be understood that, although respective boundaries for the lake 204, the parking lot 206 and the road 208 are not depicted in FIG. 2, they all correspond to respective geographic areas seen on the map representation 200 of the map and may be delimited or defined by respective boundaries generally corresponding to their respective perimeters on the map.

As such, it should be understood that, although the building process of the index 150 will be described herein with respect to the given geographic area of the park 202, the server 112 may be configured to build the index 150 such that the index 150 is associated with geographic areas of at least some of the lake 204, the parking lot 206 and the road 208, in addition to the park 202, in a similar manner and without departing from the scope of the present technology.

It should be mentioned that the map application 106 may be configured to overlay the map representation 200 with a given "boundary layer" for visually displaying the boundary 210 at a given zoom level of the map. For example, data representative of the boundary 210 (and of other potential boundaries of other geographic areas) may be provided as part of the given boundary layer that is mapped onto the map. Once the given boundary layer is mapped onto the map, the map application 106 may overlay the map representation 200 of the map at the given zoom level with the given boundary layer so as to visually display the boundary 210 as generally corresponding to the perimeter of the park 202 on the map representation 200.

Figure 3:
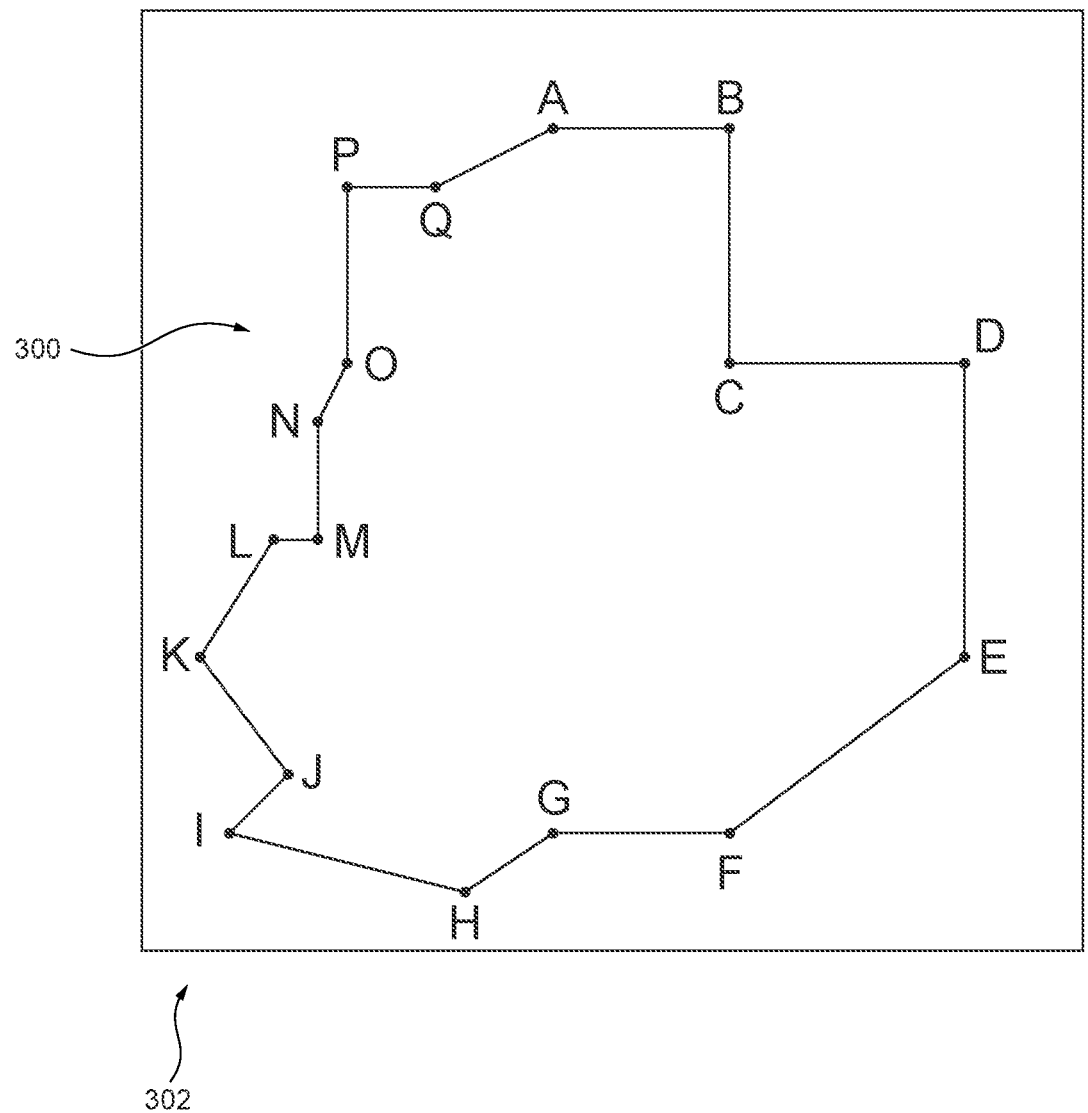
FIG. 3 depicts a polygon representing a boundary of a geographic area of the map representation of FIG. 2, in accordance with some embodiments of the present technology.

With reference to both FIGS. 2 and 3, the boundary 210 for the park 202 may be in a form of a polygon 300 having vertices and segments. In other words, the data representative of the boundary 210 provided as part of the boundary layer may correspond to data representative of the polygon 300. A number of vertices and of segments of the polygon 300 may depend on a shape of the boundary 210.

In some embodiments of the present technology, it is contemplated that the server 112 may be configured to build the index 150 for segments of the polygon 300 corresponding to the boundary 210 of the park 202. As previously alluded to, it is also contemplated that the server 112 may be configured to build the index 150 for segments of the polygon 300 and for segments of one or more additional polygons corresponding to boundaries of one or more additional respective geographic areas provided as part of the given boundary layer, without departing from the scope of the present technology.

The polygon 300 has (i) a plurality of vertices comprising vertices A through Q, and (ii) a plurality of segments connecting respective pairs of vertices of the plurality of vertices. The server 112 may be configured to identify and store in the database 114 geo-data indicative of geographic locations of the plurality of vertices of the polygon 300 on the map.

For example, the geo-data may comprise a respective latitude and a respective longitude (as well as a respective altitude, in some cases) corresponding to a geographic location on the map of a given vertex. Additionally, in some embodiments, the server 112 may be configured to store in the database 114 geo-data associated with each one of the plurality of segments of the polygon 300.

The server 112 may also be configured to store information indicative of a correspondence between the geographic area of the park 202 and the geo-data of the plurality of segments of the polygon 300 forming the boundary 210. For example, in cases where the server 112 stores geo-data associated with more than one polygons (e.g., forming more than one boundaries of respective geographic areas), the server 112 may use this information to identify which vertices and which segments that are stored in the database 114 are associated with which one of the more than one polygons, and in turn, with which one of the more than one geographic areas.

It is contemplated that in some embodiments, once geo-data associated with the polygon 300 is available and potentially stored in the database 114, the server 112 may begin the building process of the index 150.

How the server 112 builds the index 150 will now be described.

The server 112 is configured to determine a reference zone 302 that encloses all segments of the polygon 300. In other words, the server 112 may be configured to determine geo-data associated with a given zone on the map which encloses geo-data of all vertices of the polygon 300 (and other potential polygons).

It can be said that the reference zone 302 covers at least a portion of the map that encloses all the segments of the polygon 300 (and of other potential polygons). In one case, the reference zone 302 may be determined by the server 112 so as to cover at least the portion of the map that encloses all segments of the one or more polygon. In another case, the server 112 may determine that the reference zone 302 is the entire map (e.g., the reference zone 302 covers the entirety of the map).

In FIG. 3, the reference zone 302 is in a form of a square (square-shaped), however this does not need to be the case in each and every embodiment of the present technology. For example, the server 112 may be configured to determine a given reference zone in a form of a triangle, a rectangle, a pentagon, a hexagon, a circle and the like. The shape of a given reference zone may depend on inter alia a shape of the polygon 300, a shape of other potential polygons and/or various implementations of the present technology.

Once the reference zone 302 is determined by the server 112, the server 112 is configured to execute an indexing procedure for the reference zone 302. The indexing procedure for the reference zone 302 allows indexing at least some segments of the polygon 300 (and of other potential polygons) in association with the reference zone 302 in the index 150.

Generally speaking, the indexing procedure of the reference zone 302 can be summarized in two steps:
- an identification step—during which segments to be indexed in association with the reference zone 302 are identified; and
- an indexing step—during which the segments identified during the identification step are indexed in association with the reference zone 302 in the index 150.

How the server 112 is configured to execute the two steps of the indexing procedure for the reference zone 302 will now be discussed in turn with reference to FIG. 4.

During the identification step, the server 112 is configured to segment the reference zone 302. The segmentation of the reference zone 302 results in a plurality of first level zones 410, 420, 430 and 440 that are smaller in size than the reference zone 302 and which are located inside the reference zone 302 on the map.

Figure 4:
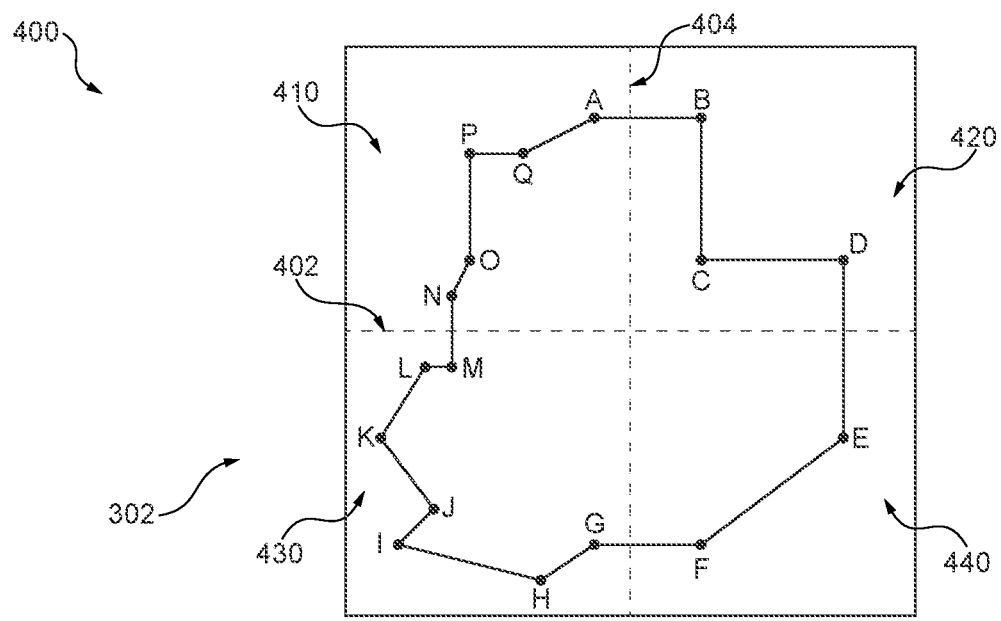
FIG. 4 depicts a visual representation illustrating an indexing procedure for a reference zone determined by a server of FIG. 1, in accordance with some embodiments of the present technology.
Figure 4:
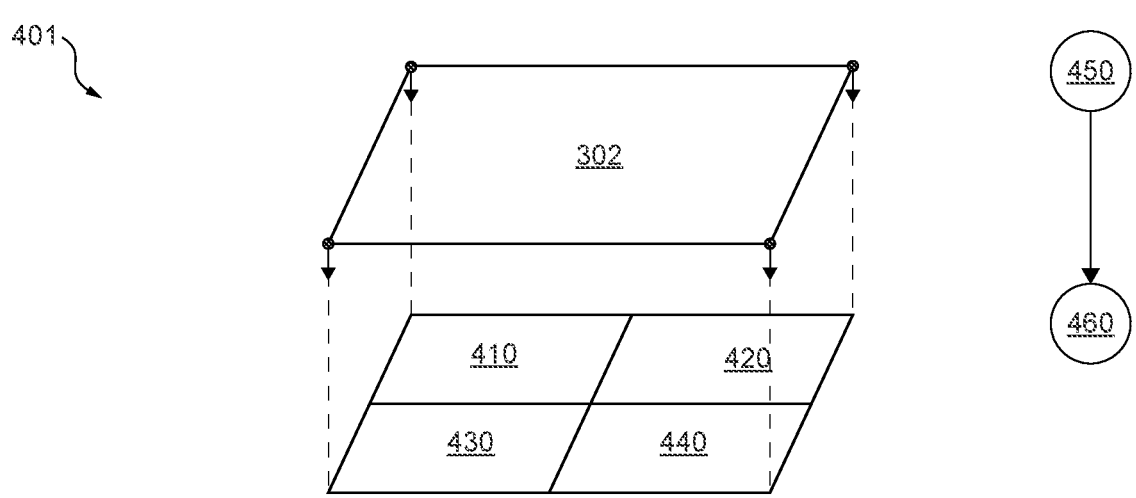

In FIG. 4, in a top portion thereof, there is depicted a visual representation 400 of how the server 112 may be configured to segment the reference zone 302. In a bottom portion thereof, there is depicted a visual representation 401 of a reference level 450 of the reference zone 302 (at which the reference zone 302 is not segmented) and a first level 460 (at which the reference zone 302 is segmented into the first level zones 410, 420, 430 and 440).

It should be understood that the visual representations 400 and 401 are depicted for visually illustrating how the server 112 is configured to execute the indexing procedure for the reference zone 302—the server 112 is not configured to generate or render per se the visual representations 400 and 401.

The server 112 is configured to determine segmenting lines 402 and 404 in order to segment the reference zone 302. The segmenting lines 402 and 404 are used by the server 112 to segment the reference zone 302 into the first level zones 410, 420, 430 and 440 at the first level 460, as mentioned above.

In FIG. 4, the first level zones 410, 420, 430 and 440 are depicted as four square-shaped zones. However, it should be understood that a number and a shape of the first level zones 410, 420, 430 and 440 may depend on inter alia the shape of the respective reference zone 302, a number of segmenting lines determined by the server 112 and/or various implementations of the present technology.

In FIG. 4, the first level zones 410, 420, 430 and 440 are depicted as being equal or, in other words, enclose equal areas of the reference zone 302. However, the first level zones 410, 420, 430 and 440 may enclose unequal areas of the reference zone 302 in other implementations without departing from the scope of the present technology.

In other words it can be said that, in the non-limiting embodiment of FIG. 4, once the segmenting lines 402 and 404 are determined, they are used by the server 112 in order to, in a sense, "tessellate" the reference zone 302 into a plurality of equal and contiguous square-shaped cells or quadrants (the first level zones 410, 420, 430 and 440) that form a grid for the reference zone 302. In this case:
- the first level zone 410 corresponds to a North-West cell or quadrant of the grid;
- the first level zone 420 corresponds to a North-East cell or quadrant of the grid;
- the first level zone 430 corresponds to a South-West cell or quadrant of the grid; and
- the first level zone 440 corresponds to a South-East cell or quadrant of the grid.

In the context of the present specification, the reference zone 302 corresponds to "a parent zone" of the first level zones 410, 420, 430 and 440. By the same token, the first level zones 410, 420, 430 and 440 correspond to respective "child zones" of the reference zone 302. Therefore, it can be said that when a given zone is segmented: (i) the given zone being at a given level is segmented in to a given plurality of zones at a subsequent level, (ii) the given plurality of zones includes child zones of the given zone, and (iii) the given zone is a parent zone to the given plurality of zones.

During the identification step, once the reference zone 302 is segmented, the server 112 is configured to identify segments of the polygon 300 (and of other potential polygons) that are located at least partially in more than one of the first level zones 410, 420, 430 and 440 (e.g., more than one quadrant of the grid of the reference zone 302). In other words, the server 112 may be configured to identify segments of the polygon 300 which intersect at least one of the segmenting lines 402 and 404 used to segment the reference zone 302.

In this example, the server 112 identifies segments A-B, D-E, F-G and M-N as located at least partially in more than one of the first level zones 410, 420, 430 and 440. So-identified segments A-B, D-E, F-G and M-N are to be indexed by the server 112 in association with the reference zone 302.

The server 112 thus executes the indexing step of the indexing procedure of the reference zone 302. Generally speaking, indexing the segments A-B, D-E, F-G and M-N in association with the reference zone 302 may comprise: (i) generating a geo-marker for the reference zone 302 that is indicative of a location of the reference zone 302 on the map and (ii) store geo-data associated with the segments A-B, D-E, F-G and M-N (and/or of the vertices connected by these segments) in association with the geo-marker of the reference 302 in the database 114.

Although the generation of the geo-marker for the reference zone 302 will be described herein, it is contemplated that the generation of the geo-marker for the reference zone 302 is optional in some embodiments of the present technology. For example, in cases where the reference zone 302 covers the entirety of the map, the server 112 may not require to generate the geo-marker for the reference zone 302—in these cases, the location of the reference zone 302 corresponds to the entire map. In such cases, segments to be indexed in association with the reference zone 302 may be indexed, for example, in association with any other suitable marker indicative of that the location of the reference zone 302 corresponds to the entire map.

In some embodiments, where the server 112 is configured to generate the geo-marker for the reference zone 302, the generation of the geo-marker for the reference zone 302 may be executed by the server 112 via a geo-hashing algorithm implemented by the server 112. Generally speaking, a geo-hashing algorithm may allow encoding the location of the reference zone 302 on the map based on geo-data (e.g., indication of coordinates) associated with the reference zone 302. For example, the server 112 may employ the geo-hashing algorithm for encoding the location of the reference zone 302 as "XXX" on the map or by any other suitable geo-hashed string.

In some embodiments, during the indexing step, the server 112 may be configured to populate a database record of the database 114 with geo-data of the segments A-B, D-E, F-G and M-N in association with the geo-marker (or any other suitable marker) of the reference zone 302.

Figure 7:
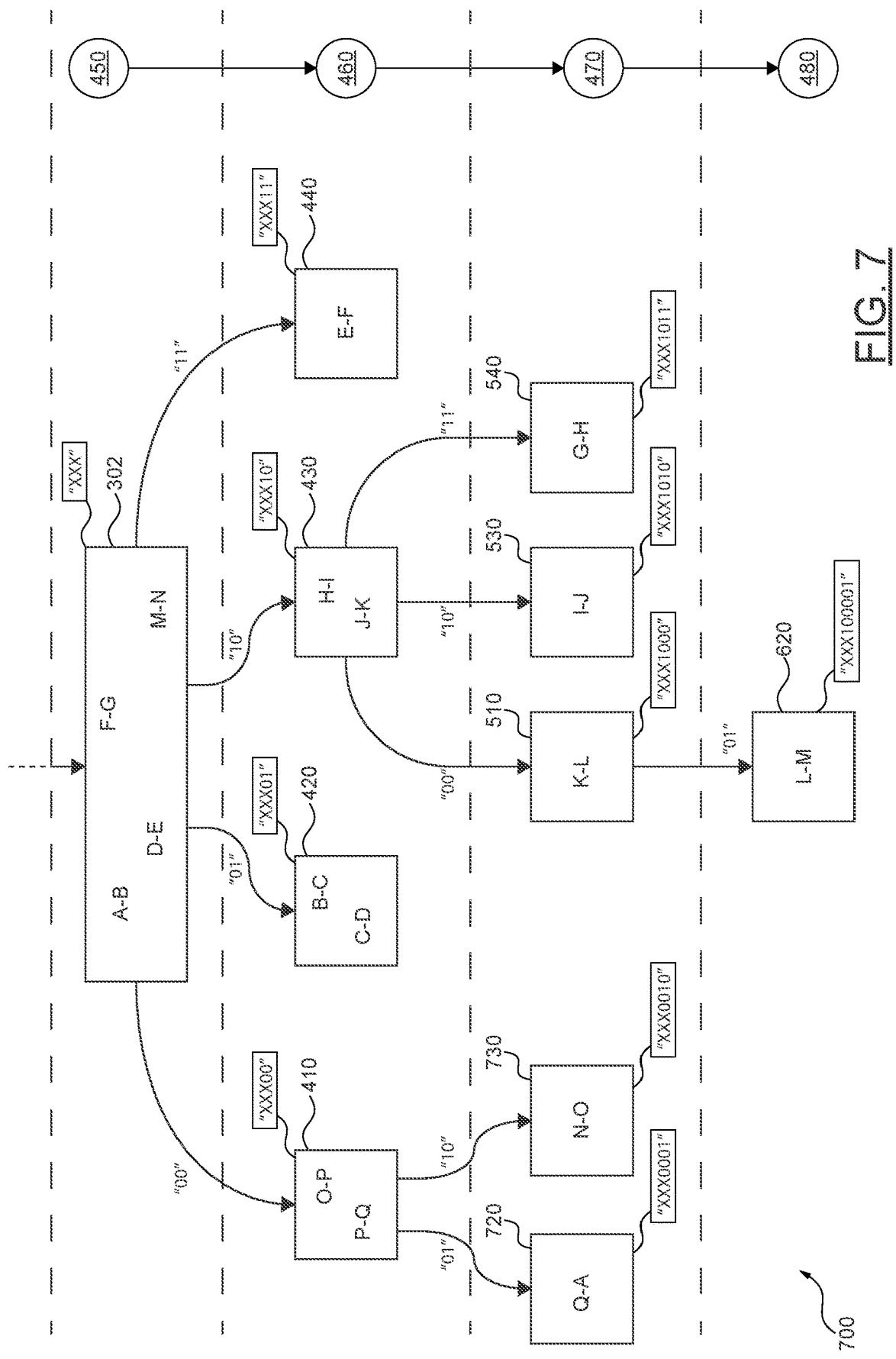
FIG. 7 depicts a schematic representation of a tree-structure of an index of FIG. 1 generated during a building process of the index, in accordance with some embodiments of the present technology.

In other embodiments, during the indexing step and with reference to FIG. 7, the server 112 may be configured to generate, for the reference zone 302, a "root node" at the reference level 450 of the tree-structure 700 and store the geo-data of the segments A-B, D-E, F-G and M-N in association with this root node. For example, assuming that the reference zone 302 covers only partially the map, the root node may be generated in association with the geo-marker "XXX" of the reference zone 302 as seen in FIG. 7.

The indexing procedure for the reference zone 302 is thus complete. It should be noted that, in some embodiments of the present technology, the indexing procedure for the reference zone 302 culminates with the generation the root node of the tree-structure 700 and where the geo-data of the segments A-B, D-E, F-G and M-N is stored.

The server 112 is also configured to continue building the index 150. For example, the server 112 may continue building the index 150 by executing indexing procedures for other given zones (other than the reference zone 302) and for indexing other segments of the polygon 300 (other than the segments A-B, D-E, F-G and M-N, since they are already indexed).

The following analogy summarizes the indexing procedure for the reference zone 302:
- the segments of the polygon 300 (and of other potential polygons) that intersect the segmenting lines 402 and/or 404, in this case the segments A-B, D-E, F-G and M-N, are in a sense "kept" at the reference level 450 and, as such, are indexed in association with the root node of the tree-structure 700 generated for the reference zone 302; and
- other segments of the polygon 300 (and of other potential polygons) that do not intersect any one of the segmenting lines 402 and 404, in this case the segments B-C, C-D, E-F, G-H, H-I, I-J, J-K, K-L, L-M, N-O, O-P, P-Q and Q-A, in a sense "fall" to a subsequent level, in this case being the first level 460, in order to be indexed in association with zones other than the reference zone 302.

For example, as seen in FIG. 4:
- the segments N-O, O-P, P-Q and Q-A are located entirely in the first level zone 410 (e.g., North-West quadrant of the reference zone 302) and, therefore, "fall" to the first level 460 and onto the first level zone 410;
- the segments B-C and C-D are located entirely in the first level zone 420 (e.g., North-East quadrant of the reference zone 302) and, therefore, "fall" to the first level 460 and onto the first level zone 420;
- the segments G-H, H-I, I-J, J-K, K-L and L-M are located entirely in the first level zone 430 (e.g., South-West quadrant of the reference zone 302) and, therefore, "fall" to the first level 460 and onto the first level zone 430; and
- the segment E-F is located entirely in the first level zone 440 (e.g., South-East quadrant of the reference zone 302) and, therefore, "falls" to the first level 460 and onto the first level zone 430.

However, as it will become apparent from the description of FIG. 5 below, the segments of the polygon 300 that "fall" to the first level 460 will not necessarily be indexed in association with the first level zones 410, 420, 430 and 440 at the first level 460. For example, the server 112 may be configured to execute indexing procedures for at least some of the first level zones 410, 420, 430 and 440, during which the server 112 may determine:
- which, if any, of the segments that "fall" to the first level 460 are to be "kept" at the first level 460 for indexing with respective ones of the first level zones 410, 420, 430 and 440; and
- which, if any, of the segments that "fall" to the first level 460 are to "fall" further to a subsequent level for indexing with other zones than (i) the reference zone 302 and (ii) the first level zones 410, 420, 430 and 440.

Again, as it will become apparent from the description of FIG. 5 below, it is contemplated that the server 112 may be configured to determine (i) which segments of a given polygon are to be "kept" at the given level (to be indexed with a given zone at the given level), and (ii) which segments of the given polygon are to "fall" further to a subsequent level, (iii) based on inter alia presence of intersections between segments of the given polygon and given segmenting lines of the given level.

Figure 5:
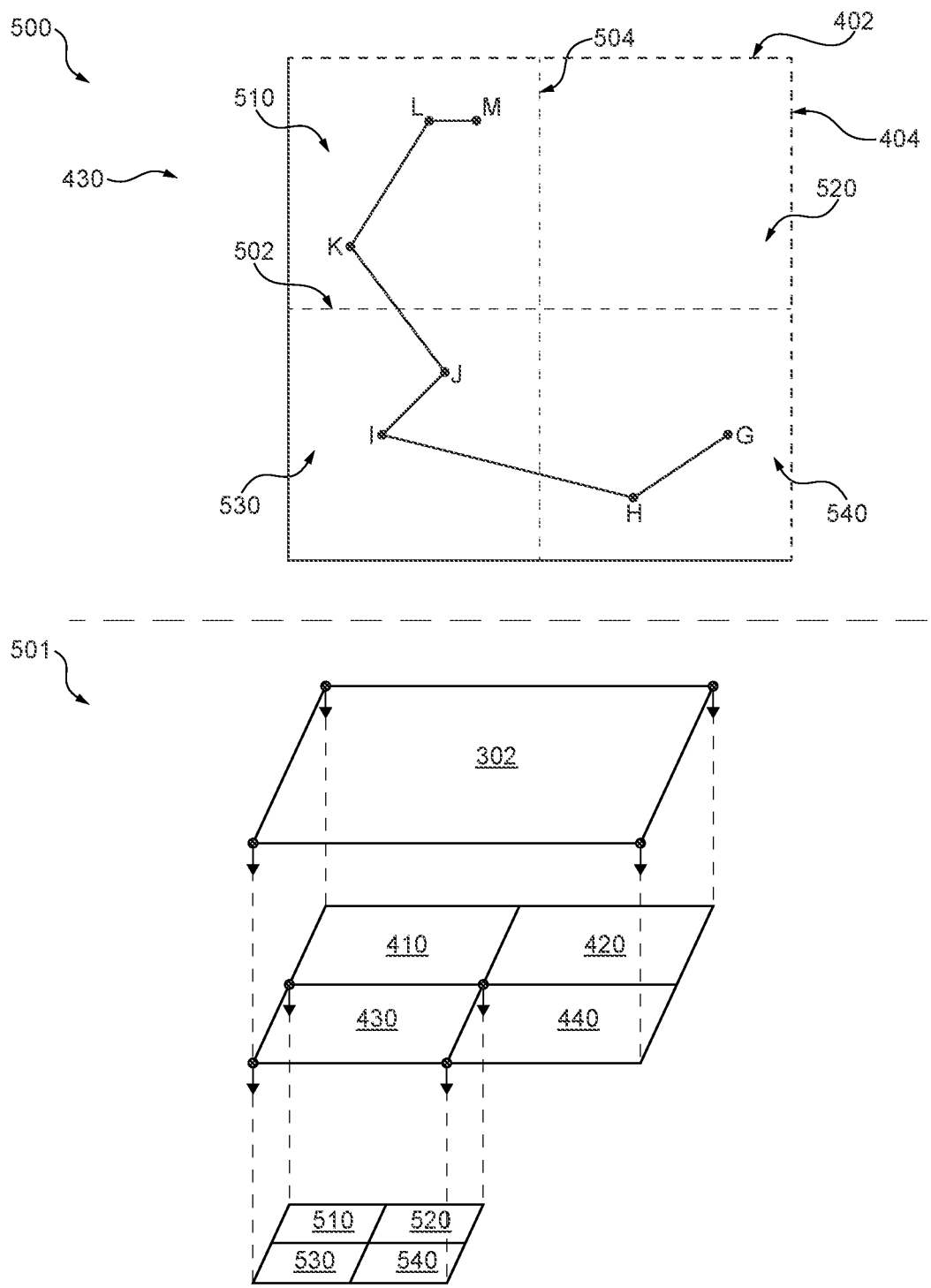
FIG. 5 depicts a visual representation illustrating an indexing procedure for a first level zone determined by a server of FIG. 1, in accordance with some embodiments of the present technology.

With reference to FIG. 5, how the server 112 is configured to execute the indexing procedure for the first level zone 430 will now be discussed. It should be understood however that the server 112 may also execute indexing procedures for the first level zones 410, 420 and 440 in a similar manner and, therefore, will not be described below in length.

Similarly to the indexing procedure of the reference zone 302, the indexing procedure of the first level zone 430 may be summarized into two steps, (i) an identification step and (ii) an indexing step. The two steps of the indexing procedure of the first level zone 430 will now be described in turn.

During the identification step, the server 112 is configured to segment the first level zone 430. The segmentation of the first level zone 430 results in a plurality of second level zones 510, 520, 530 and 540 that are smaller in size than the first level zone 430 and which are located inside the first level zone 430 on the map. Naturally, the second level zones 510, 520, 530 and 540 are also located inside the reference zone 302.

In FIG. 5, in a top portion thereof, there is depicted a visual representation 500 of how the server 112 may be configured to segment the first level zone 430. In a bottom portion thereof, there is depicted a visual representation 501 of the reference level 450 of the reference zone 302, the first level 460 of the first level zones 410, 420, 430 and 440, and a second level 470.

It should be mentioned that the second level 470 in the visual representation 501 is depicted only partially, in a sense that other ones of the first level zones 410, 420 and 440 may be segmented into respective second level zones at the second level 470, similarity to how the first level zone 430 is segmented into the second level zones 510, 520, 530 and 540, without departing from the scope of the present technology.

It should be understood that the visual representations 500 and 501 are depicted for visually illustrating how the server 112 is configured to execute the indexing procedure of the first level zone 430—the server 112 is not configured to generate or render per se the visual representations 500 and 501.

The server 112 is configured to determine segmenting lines 502 and 504 in order to segment the first level zone 430. The segmenting lines 502 and 504 are used by the server 112 to segment the first level zone 430 into the second level zones 510, 520, 530 and 540 at the second level 470, as mentioned above.

In FIG. 5, the second level zones 510, 520, 530 and 540 are depicted as four square-shaped zones. However, it should be understood that similarly to the first level zones 410, 420, 430 and 440, the number and the shape of given second level zones may depend on inter alia various implementations of the present technology.

In other words, similarly to what has been described above for the segmenting lines 402 and 404, in the non-limiting embodiment of FIG. 5, once the segmenting lines 502 and 504 are determined, they are used by the server 112 in order to, in a sense, "tessellate" the first level zone 430 into a plurality of equal and contiguous square-shaped cells or quadrants (the second level zones 510, 520, 530 and 540) that form a grid for the first level zone 430.

It should be mentioned that the first level zones 430 corresponds to a parent zone of the second level zones 510, 520, 530 and 540. By the same token, the second level zones 510, 520, 530 and 540 correspond to respective "child zones" of the first level zones 430.

As mentioned above, the segments M-N and F-G are "kept" at the reference level 450 (e.g., indexed in association with the reference zone 302) and, therefore, did not "fall" to the first level 460 and onto the first level zone 430. Only the segments G-H, H-I, I-J, J-K, K-L and L-M that "fell" to the first level 460 and onto the first level zone 430 are depicted in the visual representation 500.

During the identification step, the server 112 is configured to identify segments of the polygon 300 which are located at least partially in more than one of the second level zones 510, 520, 530 and 540 (e.g., more than one quadrant of the grid of the first level zone 430). In other words, similarly to what has been explained above, the server 112 may be configured to identify segments of the polygon 300 which intersect at least one of the segmenting lines 502 and 504.

In this example, the server 112 identifies the segments H-I and J-K as located at least partially in more than one of the second level zones 510, 520, 530 and 540. So-identified segments H-I and J-K are to be indexed by the server 112 in association with the first level zone 430.

The server 112 thus executes the indexing step of the indexing procedure of the first level zone 430. Similarly to what has been described above for the indexing step for the reference zone 302, the indexing the segments H-I and J-K in association with the first level zone 430 may comprise (i) generating a geo-marker for the first level zone 430 and (ii) store geo-data associated with the segments H-I and J-K (and/or of the vertices connected by these segments) in association with the geo-marker of the first level zone 430 in the database 114.

The geo-marker for the first level zone 430 (and geo-markers for the first level zones 410, 420 and 440) may be generated by the server 112 via the hashing algorithm. Generally speaking, once generated, the geo-marker of the first level zone 430 is indicative of (i) a location of the first level zone 430 in its parent zone (e.g., the reference zone 302), and (ii) a geographic association between the first level zone 430 and the first level zones 410, 420 and 440 (other child zones of the reference zone 302).

How the server 112 is configured to generate the geo-markers for the first level zones 410, 420, 430 and 440 will now be discussed in detail.

In some embodiments of the present technology, in order to generate a given geo-marker for a given one of the first level zones 410, 420, 430 and 440, the server 112 may be configured to: (i) encode a geographic association between the given one of the first level zones 410, 420, 430 and 440 and the other ones of first level zones 410, 420, 430 and 440, and (ii) if a geo-marker has been generated for the parent zone (in this case the reference zone 302), generate the given geo-marker by appending the geo-marker of the parent zone with the respective encoded geographic association between the given one of the first level zones 410, 420, 430 and 440 and the other ones of first level zones 410, 420, 430 and 440.

Let it be assumed, as mentioned above, that the geo-maker "XXX" has been generated for the reference zone 302. As such, the server 112 may generate the geo-markers for the first level zones 410, 420, 430 and 440 by (i) encoding the geographic association between the respective one of the first level zones 410, 420, 430 and 440 and the other ones of the first level zones 410, 420, 430 and 440 and (ii) appending the respective encoded geographic association to the geo-marker "XXX".

The geographic association between a given one of the first level zones 410, 420, 430 and 440 and the other ones of the first level zones 410, 420, 430 and 440 may be encoded in different ways. In one embodiment, the server 112 may be configured to employ Z-order encoding (e.g., Morton code) as part of the hashing algorithm. Generally speaking, the Z-order encoding allows mapping multidimensional data onto one dimension while preserving the locality of data.

For example, the server 112 may employ the Z-order encoding as part of the hashing algorithm for generating:

an encoded geographic association "00" for the first level zone 410, since the first level zone 410 is a top left (North-West) quadrant of the grid of the reference zone 302;

an encoded geographic association "01" for the first level zone 420, since the first level zone 420 is a top right (North-East) quadrant of the grid of the reference zone 302;

an encoded geographic association "10" for the first level zone 430, since the first level zone 430 is a bottom left (South-West) quadrant of the grid of the reference zone 302; and an encoded geographic association "11" for the first level zone 440, since the first level zone 440 is a bottom right (South-East) quadrant of the grid of the reference zone 302.

It should be mentioned that the geo-marker for each one of the first level zones 410, 420, 430 and 440 is indicative of a geographic association between a respective one of the first level zones 410, 420, 430 and 440 with the other ones of the first level zones 410, 420, 430 and 440 in the reference zone 302.

For example, in this case, the encoded geographic association for a given first level zone comprises two digits, where (i) the value of the first digit that can be "0" or "1" indicates whether the given first level zone is one of the top (North) first level zones in the reference zone 302 or one of the bottom (South) first level zones in the reference zone 302, respectively, and (ii) the value of the second digit that can be "0" or "1" indicates whether the given first level zone is one of the left (West) first level zones in the reference zone 302 or one of the right (East) first level zones in the reference zone 302, respectively.

In this case, the encoded geographic association "10" for the first level zone 430 comprises two digits, where (i) the first digit having the value of "1" indicates that the first level zone 430 is one of the bottom (South) first level zones in the reference zone 302, and (ii) the second digit having the value of "0" indicates that the first level zone 430 is one of the left (West) first level zones in the reference zone 302. Therefore, the combination of the two digits having the values "1" and "0", respectively, indicates that the first level zone 430 is the bottom left (South-West) first level zone amongst the first level zones 410, 420, 430 and 440 in the reference zone 302.

Also, the encoded geographic association "01" for the first level zone 420 comprises two digits, where (i) the first digit having the value of "0" indicates that the first level zone 420 is one of the top (North) first level zones in the reference zone 302, and (ii) the second digit having the value of "1" indicates that the first level zone 420 is one of the right (East) first level zones in the reference zone 302. Therefore, the combination of the two digits having the values "0" and "1" respectively indicates that the first level zone 420 is the top right (North-East) first level zone amongst the first level zones 410, 420, 430 and 440 in the reference zone 302.

However, it should be understood that, in other embodiments of the present technology, the server 112 may be configured to employ any other suitable encoding method for encoding the geographic association between a given one of the first level zones 410, 420, 430 and 440 and the other ones of the first level zones 410, 420, 430 and 440, without departing from the scope of the present technology.

As mentioned above, let it be assumed that the geo-maker "XXX" has been generated for the reference zone 302. Therefore, the server 112 may be configured to append a respective encoded geographic association to the geo-marker "XXX" of the reference zone 302 in order to generate the respective geo-markers for the first level zones 410, 420, 430 and 440, such as:
- a geo-marker "XXX00" for the first level zone 410—which means that the first level zone 410 is a North-West zone in the reference zone 302;
- a geo-marker "XXX01" for the first level zone 420—which means that the first level zone 420 is a North-East zone in the reference zone 302;
- a geo-marker "XXX10" for the first level zone 430—which means that the first level zone 430 is a South-West zone in the reference zone 302; and
- a geo-marker "XXX11" for the first level zone 440—which means that the first level zone 440 is a South-East zone in the reference zone 302.

Now that the geo-marker for the first level zone 430 is generated, the server 112 may continue the indexing step for the first level zone 430.

Recalling that the segments H-I and J-K are identified for being indexed by the server 112 in association with the first level zone 430, with reference to FIG. 7, the server 112 may be configured to generate, for the first level zone 430, a "leaf node" at the first level 460 of the tree-structure 700 and store the geo-data of the segments H-I and J-K in association with this leaf node.

The indexing procedure for the first level zone 430 is thus complete. It should be noted that, in some embodiments of the present technology, the indexing procedure for the first level zone 430 culminates with the generation of the given leaf node of the tree-structure 700 for the first level zone 430 and where the geo-data of the segments H-I and J-K is stored.

It should be mentioned that the server 112 may be configured to generate additional leaf nodes at the first level 460 for a respective one of the first level zones 410, 420 and 440, during the indexing procedures for the respective ones of the first level zones 410, 420 and 440, similarly to how the server 112 generates the leaf node at the first level 460 for the first level zone 430.

The server 112 may also be configured to continue building of the index 150. For example, the server 112 may continue building the index 150 by executing indexing procedures for other given zones (other than the reference zone 302 and the first level zones 410, 420, 430 and 440) and for indexing other segments of the polygon 300 (other than the segments that are already indexed).

It is contemplated that in some embodiments of the present technology, the server 112 may be configured to determine whether a terminal condition is met following the indexing procedure for the first level zone 430. Responsive to determining that the terminal condition is not met, the server 112 may continue building the index 150. Responsive to determining that the terminal condition is met, the server 112 may index segments of the polygon 300, which have not yet been indexed, in association with respective lowest level zones. What the terminal condition is based on and how the determination of whether the terminal condition is met is executed by the server 112 will be described in greater detail herein further below.

Returning to the description of FIG. 5, it should be noted that the segments G-H, I-J, K-L and L-M that "fell" onto the first level zone 430, and which do not intersect any of the segmenting lines 502 and 504, "fall" further to the second level 470. For example:
- the segment G-H is located entirely in the second level zone 540 and, therefore, "falls" to the second segmentation level 470 and onto the second level zone 540;
- the segment I-J is located entirely in the second level zone 530 and, therefore, "falls" to the second segmentation level 470 and onto the second level zone 530; and
- the segments K-L and L-M are located entirely in the second level zone 510 and, therefore, "fall" to the second segmentation level 470 and onto the second level zone 510.

Figure 6:
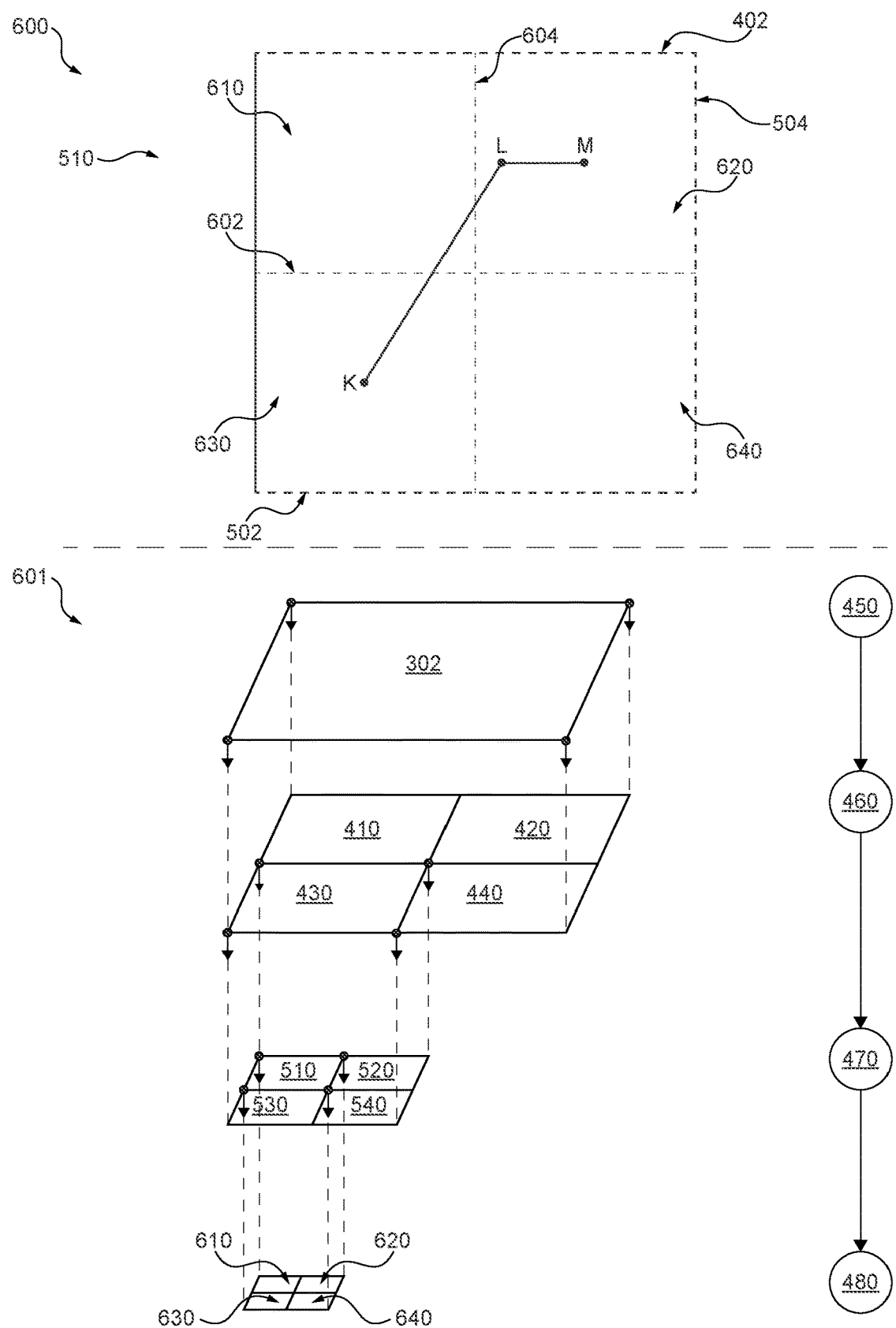
FIG. 6 depicts a visual representation illustrating an indexing procedure for a second level zone determined by a server of FIG. 1, in accordance with some embodiments of the present technology.

With reference to FIG. 6, how the server 112 is configured to execute the indexing procedure for the second level zone 510 will now be discussed. It should be understood however that the server 112 may also execute indexing procedures for the second level zones 530 and 540 in a similar manner and, therefore, will not be described below in any length.

It should be mentioned that, the server 112 may not execute an indexing procedure for the second level zone 520 since none of the segments of the polygon 300, in this example, "fell" onto the second level zone 520. Since there is no need to index any segments in association with the second level zone 520 in this case, there is no need to execute the indexing procedure for the second level zone 520 nor to generate a node in the tree-structure 700 (see FIG. 7) associated with the second level zone 520.

Similarly to the indexing procedure of the first level zone 430, the indexing procedure of the second level zone 510 may be summarized into two steps, (i) an identification step and (ii) an indexing step. The two steps of the indexing procedure of the second level zone 510 will now be described in turn.

During the identification step, the server 112 is configured to segment the second level zone 510. The segmentation of the second level zone 510 results in a plurality of third level zones 610, 620, 630 and 640 that are smaller in size than the second level zone 510 and which are located inside the second level zone 510 on the map. Naturally, the third level zones 610, 620, 630 and 640 are also located inside the reference zone 302.

In FIG. 6, in a top portion thereof, there is depicted a visual representation 600 of how the server 112 may be configured to segment the second level zone 510. In a bottom portion thereof, there is depicted a visual representation 601 of the reference level 450 of the reference zone 302, the first level 460 of the first level zones 410, 420, 430 and 440, the second level 470 of the second level zones 510, 520, 530 and 540 and a third level 480.

It should be mentioned that the third level 480 in the visual representation 601 is depicted only partially, in a sense that other ones of the second level zones 510, 520 and 540 and other second level zones of the first level zones 410, 420 and 440 may be segmented into respective third level zones at the third level 480, similarity to how the second level zone 510 is segmented into the third level zones 610, 620, 630 and 640, without departing from the scope of the present technology.

It should be understood that the visual representations 600 and 601 are depicted for visually illustrating how the server 112 is configured to execute the indexing procedure of the second level zone 510—the server 112 is not configured to generate or render per se the visual representations 600 and 601.

The server 112 is configured to determine segmenting lines 602 and 604 in order to segment the second level zone 510. The segmenting lines 502 and 504 are used by the server 112 to segment the second level zone 510 into the third level zones 610, 620, 630 and 640 at the third level 480, as mentioned above.

As mentioned above, only the segments K-L and L-M that "fell" to the second level 470 and onto the second level zone 510 are depicted in the visual representation 500. During the identification step, similarly to what has been explained above, the server 112 may be configured to identify segments of the polygon 300 which intersect at least one of the segmenting lines 602 and 604.

In this example, the server 112 identifies the segment K-L as located at least partially in more than one of the third level zones 610, 620, 630 and 640. So-identified segment K-L is to be indexed by the server 112 in association with the second level zone 510.

The server 112 thus executes the indexing step of the indexing procedure of the second level zone 510. Similarly to what has been described above for the indexing step for the first level zone 430, the indexing the segment K-L in association with the first level zone 430 may comprise (i) generating a geo-marker for the second level zone 510 and (ii) store geo-data associated with the segment K-L in association with the geo-marker of the second level zone 510 in the database 114.

The geo-marker for the second level zone 510 (and geo-makers for the second level zones 530 and 540) may be generated by the server 112 via the hashing algorithm, similarly to how the geo-markers for the first level zones 410, 420, 430 and 440 are generated and, thus will not be described in greater length.

However, it should be noted that, instead of appending the respective encoded geographic association between a given one of the second level zones 510, 520, 530 and 540 and the other ones of the second level zones 510, 520, 530 and 540 to the geo-marker of the reference zone 302 (as in the example of FIG. 5), the server 112 appends this respective encoded geographic association to the geo-marker of the first level zone 430. Indeed, it should be recalled that the server 112 is configured to append the respective encoded geographic association to a geo-marker of a respective parent zone for generating a geo-marker for a respective child zone. In the case of the first level zone 430 (example of FIG. 5), the parent zone is the reference zone 302. In the case of the second level zone 510 (example of FIG. 6), the parent zone is the first level zone 430.

Therefore, the server 112 may be configured to append a respective encoded geographic association to the geo-marker "XXX10" of the first level zone 430 in order to generate the respective geo-markers for the second level zones 510, 530 and 540, such as:

a geo-marker "XXX1000" for the second level zone 510—which means that (i) the second level zone 510 is a North-West zone in the first level zone 430 and (ii) the second level zone 510 is a North-West zone in a South-West zone (the first level zone 430) of the reference zone 302;

a geo-marker "XXX1010" for the second level zone 530—which means that (i) the second level zone 530 is a South-West zone in the first level zone 430 and (ii) the second level zone 530 is a South-West zone in a South-West zone (the first level zone 430) of the reference zone 302; and a geo-marker "XXX1011" for the second level zone 540—which means that (i) the second level zone 530 is a South-East zone in the first level zone 430 and (ii) the second level zone 530 is a South-East zone in a South-West zone (the first level zone 430) of the reference zone 302.

Again, it should be noted that, in this example, the server 112 may not be required to generate the geo-marker for the second level zone 520, as explained above. Now that the geo-marker for the second level zone 510 is generated, the server 112 may continue to the indexing step for the second level zone 510.

Recalling that the segment K-L is identified for being indexed by the server 112 in association with the second level zone 510, with reference to FIG. 7, the server 112 may be configured to generate, for the second level zone 510, a "leaf node" at the second level 470 of the tree-structure 700 and store the geo-data of the segment K-L in association with this leaf node.

The indexing procedure for the second level zone 510 is thus complete. It should be noted that, in some embodiments of the present technology, the indexing procedure for the second level zone 510 culminates with the generation of the given leaf node of the tree-structure 700 for the second level zone 510 and where the geo-data of the segment K-L is stored.

It should be mentioned that the server 112 may be configured to generate additional leaf nodes at the second level 470 for a respective one of the second level zones 530 and 540 and for other second level zones of the first level zones 410, 420 and 440, similarly to how the server 112 generates the leaf node at the second level 470 for the second level zone 510.

The server 112 may also configured to continue building of the index 150. For example, the server 112 may continue building the index 150 by executing indexing procedures for other given zones (other than the reference zone 302 and the first level zones 410, 420, 430 and 440) and for indexing other segments of the polygon 300 (other than the segments that are already indexed).

In some embodiments of the present technology, the server 112 may be configured to continue building of the index 150 at least until the terminal condition is met. It is contemplated that the terminal condition may be based on at least one of: (i) a number of pixels enclosed in at least one lowest level zone, and (ii) a number of segments located entirely in the at least one lowest level zone.

For example, the terminal condition may be met responsive to the server 112 determining that at least one of: (i) the number of pixels enclosed in at least one lowest level zone is below a pre-determined minimum number of pixels to be enclosed in the at least one lowest level zone, and (ii) the number of segments located entirely in the at least one lowest level zone is below a pre-determined minimum number of segments to be located entirely in the at least one lowest level zone.

The pre-determined minimum number of pixels to be enclosed in the at least one lowest level zone and/or the pre-determined minimum number of segments to be located entirely in the at least one lowest level zone may be determined by an operator of the server 112. For example, the operator of the server 112 may determine the pre-determined minimum number of pixels to be enclosed in the at least one lowest level zone and/or the pre-determined minimum number of segments to be located entirely in the at least one lowest level zone in order to control a size of a given tree-structure to be generated as a result of the process of building the index 150.

Let it be assumed that for both of the two following examples an identical polygon is processed on an identical map. In the first example, if the pre-determined minimum number of pixels to be enclosed in the at least one lowest level zone and/or the pre-determined minimum number of segments to be located entirely in the at least one lowest level zone is high, it should be understood that the terminal condition will be met sooner in the process of building the index 150 and, therefore, the respective tree-structure will be potentially smaller (potentially fewer nodes on potentially fewer levels). In the second example, if the pre-determined minimum number of pixels to be enclosed in the at least one lowest level zone and/or the pre-determined minimum number of segments to be located entirely in the at least one lowest level zone is low, it should be understood that the terminal condition will be met later in the process of building the index 150 and, therefore, the respective tree-structure will be potentially larger (potentially more nodes on potentially more levels).

It should be understood that, the larger a given tree-structure of the index 150 is, the more resource expensive the look-up and/or data retrieval operations from the index 150 are. As a result, in view of a physically limited amount of processing power of the server 112, the amount of time that is required for the server 112 for looking-up and/or retrieving data from the index 150 is higher for larger tree-structures than for smaller tree-structures. Therefore, having control over the size of a given tree-structure being built may be beneficial for the operator of the server 112 in order to have the server 112 generate the given tree-structure of a controlled size that can be used effectively during the look-up and/or data retrieval operations.

As it will be discussed in greater detail with reference to FIG. 8, during in-use phase of the index 150, the server 112 is configured to access at least some of the nodes of the tree-structure 700 in order to retrieve geo-data associated with the at least some nodes for further processing thereof. Therefore, controlling the size of the tree-structure 700 to be generated as a result of the process of building the index 150, via the terminal condition, may allow reducing the overall number of nodes (on potentially more than one levels) of the tree-structure 700 that the server 112 may potentially need to access for retrieving geo-data, which in turn reduces the amount of time required for the look-up and/or data retrieval operations from the index 150.

It should also be mentioned that the terminal condition being met—in other words, when the server 112 determines that at least one of (i) the number of pixels included in at least one lowest level zone is below the pre-determined minimum number of pixels to be enclosed in the at least one lowest level zone, and (ii) the number of segments located entirely in the at least one lowest level zone is below the pre-determined minimum number of segments to be located in the at least one lowest level zone—does not mean that segments of the polygon 300 (and of other potential polygons) that are not yet indexed by the time the terminal condition is met will not be indexed. To the contrary, the segments of the polygon 300 that are not yet indexed by the time the terminal condition is met are to be indexed in association with the respective lowest level zones. As a result, lowest level nodes of a given tree-structure may be associated with a greater number of segments if the terminal condition is met earlier in the process of building the index 150, than lowest level nodes of another given tree-structure if the terminal condition is met later in the process of building the index 150.

Additionally or alternatively, the terminal condition may be met once all segments of the polygon 300 and of other potential polygons to be associated with the index 150 are indexed by the server 112. For example, the server 112 may be configured to track, potentially during an indexing procedure of each given zone, a number of segments of the polygon 300 (and of other potential polygons) that are already indexed and/or that are not yet indexed. Thus, the terminal condition may be met when the server 112 determines that (i) all the segments to be indexed in the index 150 are already indexed and/or (ii) all the segments to be index will be indexed following execution of a current indexing procedure.

It should be noted that, since all the segments of the polygon 300 (and of other potential polygons) are indexed, irrespective of the size of a given tree-structure, having a smaller tree-structure may result, in some cases, with the server 112 potentially retrieving a larger amount of geo-data during at least some retrieval operations. As explained above, having a smaller tree-structure may result in a potentially larger amount of geo-data stored in its lowest level nodes than the amount of geo-data stored in lowest level nodes of a larger tree-structure. As a result, if the server 112 needs to access some lowest level nodes during a given data retrieval operation, having a smaller tree-structure may, in some cases, increase the amount of time required for further processing the so-retrieved geo-data.

However, this "trade-off" between (i) a lesser amount of time required for the retrieval of geo-data from a given tree-structure of a so-controlled size, and (ii) a potentially greater amount of time required, in some cases, for further processing of the retrieved geo-data from the given tree-structure of the so-controlled size, may be beneficial in some cases for reducing the overall amount of time required to (i) retrieve and (ii) process the geo-data all together.

The server 112 may be configured to verify whether the terminal condition is met before, during and/or after the indexing procedure of each given zone. For example, as previously alluded to, in response to the terminal condition being met, the server 112 may be configured to index given segments that are not yet indexed, which are located within only one respective subsequent level zone and which as a result "fall" to a subsequent level, in association with the only one respective subsequent level zone (in this case, the only one respective subsequent level zone may be a given lowest level zone). In other words, upon determining that the terminal condition is met, the server 112 may be configured to index all segments that "fall" to a subsequent level in association with respective zones at the subsequent level (in this case, the respective zones at the subsequent level may be respective lowest level zones).

With reference to FIG. 7, as mentioned above, there is depicted the tree-structure 700 that has been generated by the server 112 during the building process of the index 150. As previously mentioned, the tree-structure 700 comprises a number of nodes at different levels. For example, the tree-structure 700 comprises (i) the root node at the reference level 450, (ii) four leaf nodes at the first level 460, (iii) five leaf nodes at the second level 470 and (iv) one leaf node at the third level 480.

Each node of the tree-structure 700 is associated with a respective zone and segments having been indexed by the server 112 during the building process of the index 150, as explained above. For example, (i) the root node is associated with the reference zone 302, (ii) the four leaf nodes at the first level 460 are respectively associated with the first level zones 410, 420, 430 and 440, (iii) the five leaf nodes at the second level 470 are respectively associated with second level zones 720 and 730 of the first level zone 410 and with the second level zones 510, 530 and 540 of the first level zone 430 and (iv) the one leaf node at the third level 480 is associated with the third level zone 620 of the second level zone 510.

It should also be mentioned that the geo-markers of nodes of the tree-structure 700 are generated so that the server 112, based on the geo-markers associated with the nodes, is able to determine a geographic association between a given node in the tree-structure 700 and another given node in the tree-structure 700. It can be said that by storing the geo-markers associated with respective nodes in the tree-structure 700, tree-structure 700 includes information about "geographic associations" between nodes (respective zones).

In some embodiments of the present technology, the server 112 may be configured to employ a masking algorithm in order to determine the geographic association between two given zones (two given nodes). This masking algorithm, when executed by the server 112, may be configured to determine along which direction (i) a first given zone associated with a first given node and a first given geo-marker is located with respect to (ii) a second given zone associated with a second given node and a second given geo-marker, based on values of digits of the first given geo-marker and the second given geo-marker.

For example, the masking algorithm may comprise a large number of heuristic rules, which are determined by the operator of the server 112, based on the manner that the geo-markers are generated for the respective zones. It can be said that the large number of heuristic rules of the masking algorithm allow the server 112 executing the masking algorithm to perform a logical analysis based on the values of digits of the geo-markers in order to, in a sense, "extract" a geographic association between two given zones (e.g., two given nodes in the tree-structure 700). How the server 112 is configured to use the masking algorithm for determining geographic associations between nodes of the tree-structure 700 during the in-use phase of the index 150 will be described with reference to FIG. 8.

Returning to the description of FIG. 1, as mentioned above, the device 102 is configured to generate the indication 164 of the location of the given target point. For example, the map representation 200 (see FIG. 2) of the map may be displayed on the output device 103 (a screen connectable to the device 102, for example) and the device 102 may receive an indication of a user interaction of the user 102 with a portion of the map representation 200—the user 104 may click, select or "touch" (e.g., if the display device 103 is a touch screen) the portion of the map representation 200, thereby indicating the location of the given target point on the map representation 200. The device 103 may receive this indication of the user interaction and transmit it to the server 112 via the indication 164. For example, the indication 164 may comprise geo-data associated with location of the given target point.

The server 112 is configured to determine whether the location of the target point is inside or outside a given geographic area associated with the index 150. It is contemplated that the server 112 may be configured to determine whether the location of the target point is inside or outside the given geographic area based on (i) the location of the target point on the map (e.g., geo-data associated with the target point), (ii) a set of target segments from the totality of segments of a given polygon associated with the given geographic area in the index 150 and (iii) an execution of a ray casting algorithm.

One way of finding whether a given location of a given point is inside or outside a given polygon is to test how many times a ray, projecting from the given location along a given direction, intersects the segments of the given polygon. In one case, if the given location is outside of the given polygon, the ray will intersect the segments of the given polygon an even number of times. In another case, if the given location is inside of the given polygon, the ray will intersect the segments of the given polygon an odd number of times.

Thus, broadly speaking, the sever 112 may be configured to:
execute the ray casting algorithm in order to generate a given ray projecting from the location of the target point along a pre-determined direction;
retrieve geo-data about the set of target segments from the totality of segments of the given polygon associated with the given geographic area in the index 150; and
determine whether the location of the target point is inside or outside the given geographic area based on a number of times the given ray intersects the segments in the set of target segments of the given polygon.

How the server 112 is configured to execute the ray casting algorithm, how the pre-determined direction of the given ray is determined, how the geo-data of the set of target segments of the given polygon is retrieved from the index 150 and how the server 112 determines the number of times that the given ray intersects the segments in the set of target segments, will now be described with reference to both FIGS. 7 and 8.

Figure 8:
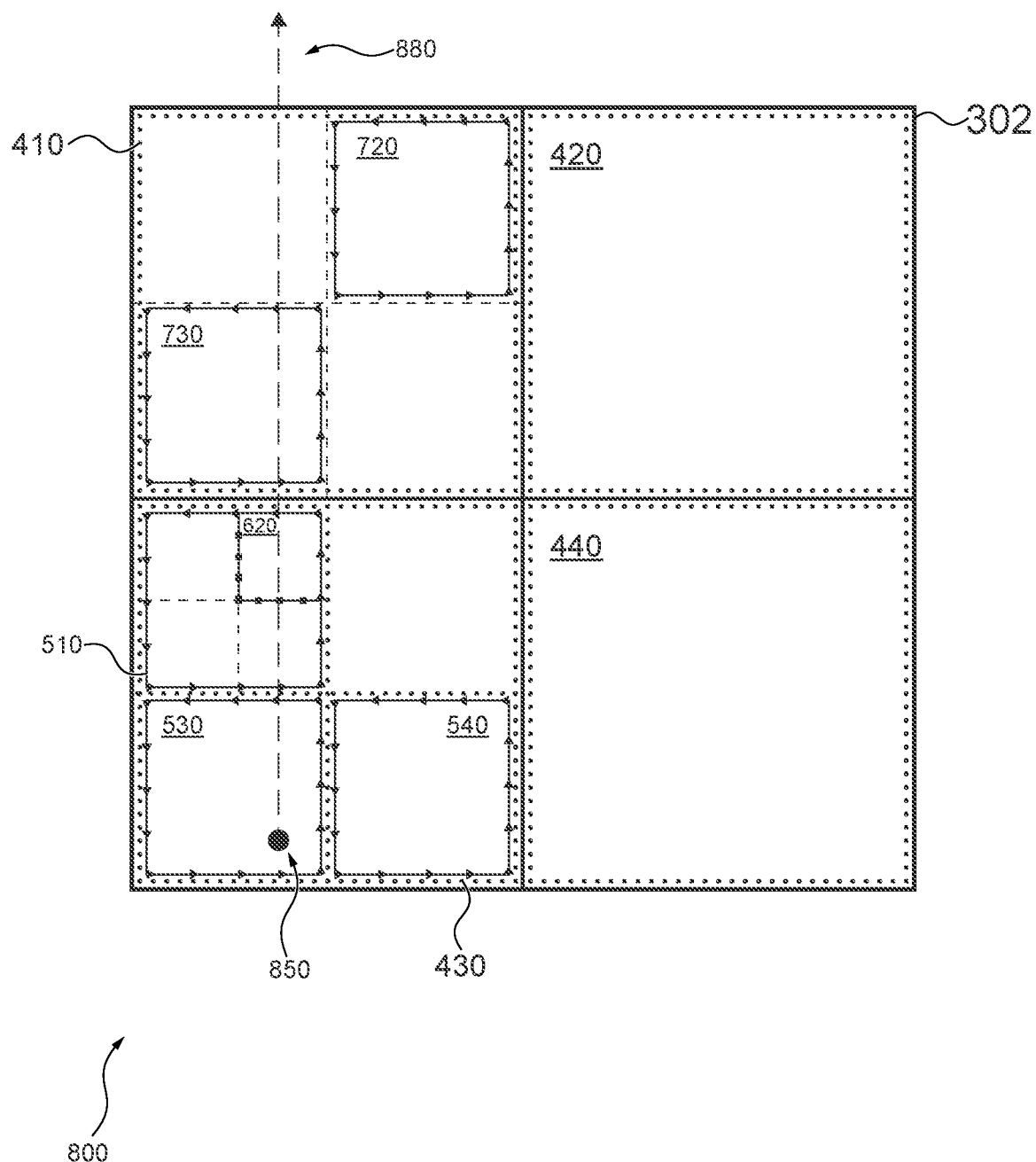
FIG. 8 depicts a visual representation illustrating zones that are associated with respective nodes of the tree-structure of FIG. 7, in accordance with some embodiments of the present technology.

In FIG. 8 there is depicted a visual representation 800 of zones that are associated with respective nodes of the tree-structure 700 of FIG. 7. It should be understood that the visual representation 800 is depicted for visually illustrating how the server 112 is configured to access the tree-structure 700 of the index 150—the server 112 is not configured to generate or render per se the visual representation 800.

In FIG. 8, there is depicted a location 850 of the target point on the map and a ray 880 projecting from the location 850 in a pre-determined direction. The pre-determined direction along which the ray 880 projects may be determined by the server 112 based on how the geographic associations between child zones of a given parent zone have been encoded.

For example, recalling that the server 112 may have encoded the geographic associations between child zones of a given parent zone by employing Z-order encoding as part of the hashing algorithm, where a geographic association between a given child zone and other child zones of a common parent zone is represented by whether the given child zone is (i) a top (North) or bottom (South) one in the common parent zone, and (ii) a left (West) or right (East) one in the common parent zone, the server 112 may execute the ray casting algorithm such that a given ray projects in either one of (i) North direction, (ii) South direction, (iii) West direction, and (iv) East direction.

Let it be assumed that, as illustrated in FIG. 8, the server 112 executes the ray casting algorithm such that the ray 880 projects from the location 850 along the pre-determined direction being the North direction.

How the server 112 is configured to determine whether the location 850 of the target point is inside or outside the geographic area being the park 202 will now be described. However, it should be understood that the server 112 may be configured to determine whether the location 850 target point is inside or outside another given geographic area (such as the lake 204, the parking lot 206 or the road 208) in a similar manner to how the server 112 is configured to determine whether the target point is inside or outside the geographic area being the park 202, without departing from the scope of the present technology.

In some cases, it is contemplated that the location 850 of the target point may potentially be located inside more than one geographic areas if the more than one geographic areas are at least partially overlapping each other. In some embodiments of the present technology, as it will become apparent from the description below, the server 112 may be configured to determine inside which ones of the geographic areas, which are associated with the index 150, the location 850 of the target point is.

As mentioned above, in order to determine whether the location 850 of the target point is inside or outside the geographic area being the park 202, the server 112 may be configured to retrieve information about the set of target segments amongst the totality of segments of the polygon 300 that define the boundary 210 of the park 202. In order to retrieve information about the set of target segments, the server 112 may be configured to access the index 150.

The server 112 may be configured to access the index 150 and determine a lowest level target zone associated with location 850 of the target point in the tree-structure 700. Generally speaking, the lowest level target zone is a given lowest level zone in the tree-structure 700 that corresponds to the location 850 of the target point or, in other words, it is the given lowest level zone that encloses the location 850 of the target point.

In some embodiments, the server 112 may be configured to determine the lowest level target zone at least partially based on the geo-markers of zones in the index 150. For example, the server 112 may be configured to compare the location 850 of the target point against the geo-markers of zones in the index 150.

In some embodiments, the server 112 may be configured to use the hashing algorithm, as described above, during the comparison of the location 850 of the target point against the geo-markers of the zones in the index 150. For example, the server 112 may be configured to use the hashing algorithm for generating a geo-hashed string from the geo-data associated with the location 850 of the target point and compare the so-generated geo-hashed string with the geo-markers of nodes stored in the tree-structure 700.

In accordance with what is depicted in the visual representation 800, by comparing the location 850 of the target point against the geo-markers of zones in the index 150 (e.g., geo-markers of nodes of the tree-structure 700), the server 112 may be configured to determine that the reference zone 302, the first level zone 430 and the second level zone 530 correspond to the location 850 of the target point—in other words, the server 112 may determines that the location 850 is enclosed in each one of the reference zone 302, the first level zone 430 and the second level zone 530. The server 112 may also determine that the lowest level target zone is the second level zone 530, since it is the lowest level zone in the tree-structure 700 amongst the reference zone 302, the first level zone 430 and the second level zone 530.

Once the server 112 determines the lowest level target zone for the location 850 of the target point, the server 112 may be configured to determine other target zones which are zones stored in association with respective nodes in the index 150 and that are (i) at least partially located along the pre-determined direction (e.g., the North direction of the ray 880) on the map from the lowest level target zone and (ii) at least partially aligned in the pre-determined direction with the lowest level target zone. In other words, the server 112 may determine other zones associated with nodes of the tree-structure 700 that are (i) at least partially located along the North direction from the second level zone 530 and (ii) at least partially aligned in the North direction with the second level zone 530.

It is contemplated that the server 112 may be configured to determine these other target zones based on the geo-markers of zones stored in the index 150. For example, the server 112 may be configured to execute the masking algorithm on the geo-markers of zones stored in the index 150 in order to determine the other target zones in the tree-structure 700.

In this case, the server 112 may determine that the other target zones are: the second level zone 510, the third level zone 620, the first level zone 430, the first level zone 410, the second level zone 730 and the reference zone 302.

As mentioned above, the heuristic rules of the masking algorithm allow the server 112 executing the masking algorithm to perform a logical analysis based on the values of digits of the geo-markers in order to, in a sense, "extract" geographic association between zones associated with these geo-markers. How the server 112 is configured to perform this logical analysis by executing the masking algorithm for determining the other target zones that are at least partially located along the North direction of the ray 880 from the second level zone 530 and that are at least partially aligned with the second level zone 530 in the North direction of the ray 880 will now be described.

However, it should be understood that a person skilled in the art having appreciated the description herein, will understand that the logical analysis may vary depending on inter alia the manner in which the geographic associations have been encoded, the pre-determined direction of a given ray and different implementations of the present technology.

The logical analysis performed by the server 112 via execution of the masking algorithm is initiated with (i) the lowest level target zone being the second level zone 530 and (ii) the pre-determined direction of the ray 880 being the North direction. The goal of the logical analysis is to determine zones that are (i) at least partially located along the North direction from the second level zone 530 and (ii) at least partially aligned with the second level zone 530 in the North direction.

In a first instance, the server 112 may be configured to "go-up" in the tree-structure 700 from the node of the second level zone 530 to the node of the first level zone 430 and execute the masking algorithm on the geo-marker "XXX10" of the first level zone 430. The server 112 may thus determine, based on the geo-markers of the second level zone 530 and of the first level zone 430, that the first level zone 430 is the parent zone of the second level zone 530. Since the first level zone 430 is the parent zone of the second level zone 530, the server 112 identifies the first level zone 430 as one of the other target zones. Indeed, since the first level zone 430 is the parent zone of the second level zone 530, the first level zone 430 includes the second level zone 530 and can thus be (i) at least partially located along the North direction from the second level zone 530 and (ii) at least partially aligned with the second level zone 530 in the North direction.

Once the server 112 accessed a given node in the tree-structure 700 that (i) is associated with a given one of the other target zones and (ii) has child nodes, the server 112 may be configured to "go-down" in the tree-structure 700 from the given node to the respective child nodes for determining whether the respective child nodes and/or other nodes stemming from the respective child nodes are associated with zones to be included in the other target zones.

Therefore, in a second instance, the server 112 may be configured to "go-down" in the tree-structure 700 from the node of the first level zone 430 to other child nodes of the node of the first level zone 430 and execute the masking algorithm on the geo-markers of the other child nodes of the node of the first level zone 430. In other words, the server 112 may execute the masking algorithm on the geo-markers of the second level zones 510 and 540.

The server 112 may be configured to compare the geo-marker of the second level zone 530 against the geo-marker of the second level zone 540. The server 112 may determine, in this case based on the values of the last two digits of each one of the geo-markers of the second level zones 530 and 540, that the second level zone 540 is (i) located along the East direction from the second level zone 530 and/or not located at least partially along the North direction from the second level zone 530, and (ii) not aligned with the second level zone 530 in the North direction. Thus, the server 112 does not identify the second level zone 540 as being one of the other target zones.

It should be noted that, if additional nodes have been stemming from the node of the second level zone 540 in the tree-structure 700, the server 112 may be configured not to compare or otherwise "skip" the comparison between geo-markers associated with these additional nodes and the geo-marker of the second level zone 530. Indeed, zones associated with these additional nodes would have been included in the second level zone 540 and thus, since the second level zone 540 is not one of the other target zones, the zones associated with these additional nodes could not possibly be (i) at least partially located along the North direction from the second level zone 530, and (ii) at least partially aligned with the second level zone 530 in the North direction.

The server 112 may be configured to compare the geo-marker of the second level zone 530 against the geo-marker of the second level zone 510. The server 112 may determine, in this case based on the values of the last two digits of each one of the geo-markers of the second level zones 510 and 530, that the second level zone 510 is (i) located along the North direction from the second level zone 530, and (ii) aligned with the second level zone 530 in the North direction. Thus, the server 112 identifies the second level zone 510 as one of the other target zones.

In a third instance, as explained above, since the node associated with the second level zone 510, which is one of the other target zones, has a given child node, the server 112 may be configured to "go-down" in the tree-structure 700 from the node of the second level zone 510 to the given child node and execute the masking algorithm on the geo-marker of the given child node. For example, the server 112 may be configured to "go-down" in the tree-structure 700 from the node of the second level zone 510 to the node associated with the third level zone 620 and execute the masking algorithm on the geo-marker "XXX100001" of third level zone 620.

The server 112 determines, based on the geo-markers of the third level zone 620 and of the second level zone 530, that the node of the third level zone 620 (i) is a child node of the node associated with the second level zone 510 that is one of the other target zones and (ii) is on the third level 480 of the tree-structure 700 that is below the second level 470 of the second level zone 530. This means that the third level zone 620 (i) is included in the second level zone 510 that has been determined to be one of the other target zones and (ii) is smaller in size than the second level zone 530. As a result, the third level zone 620 is also (i) located along the North direction from the second level zone 530, and (ii) aligned with the second level zone 530 in the North direction. Thus, the server 112 identifies the third level zone 620 as one of the other target zones.

It should be noted that once the server 112 is at the bottom of a given branch in the tree-structure 700, the server 112 may "go-up" back to the node from which the given branch is stemming. For example, in a fourth instance, once the server 112 is at the node of the third level zone 620 of a given branch of the tree-structure 700 stemming from the first level node 430, the server 112 cannot "go-down" further from the node of the third level zone 620 in the tree-structure 700. As a result, the server 112 is configured to "go-up" back to the node of the first level zone 430, and from there "go-up" to the root node of the reference zone 302.

Thus, the server 112 may execute the masking algorithm on the geo-marker "XXX" of the reference zone 302. The server 112 may determine, based on the geo-marker of the second level zone 530 and the geo-marker of the reference zone 302, that the reference zone 302 includes the second level zone 530. The server 112 thus identifies the reference zone 302 as one of the other target zones. Indeed, since the reference zone 302 includes the second level zone 530, the reference zone 302 can be (i) at least partially located along the North direction from the second level zone 530, and (ii) at least partially aligned with the second level zone 530 in the North direction.

In a fifth instance, as explained above, since the root node associated with the reference zone 302, which is one of the other target zones, has other child nodes, the server 112 may be configured to "go-down" in the tree-structure 700 from the root node to the other child nodes and execute the masking algorithm on the geo-markers of the other child nodes. For example, the server 112 may be configured to "go-down" in the tree-structure 700 from the root node of the reference zone 302 to the nodes associated with the first level zones 410, 420 and 430 and execute the masking algorithm on the geo-markers of the nodes of the first level zones 410, 420 and 440.

It should be recalled that the geo-markers of the first level zones 420 and 440 are respectively "XXX01" and "XXX11", while the geo-marker of the second level zone 530 is "XXX1010". In this case, the server 112 may be configured to compare the values of the last two digits of the geo-markers of the first level zones 420 and 440 against the values of the two digits preceding the last two digits of the geo-marker of the second level zone 530. In other words, the server 112 may compare "01" from the geo-marker of the first level zone 420 and "11" from the geo-marker of the first level zone 440 against "10" from the geo-marker of the second level zone 530.

It should be noted that the "10" from the geo-marker of the second level zone 530 is the encoded geographic association of a given zone including the second level zone 530 and which is located on a same level in the tree-structure 700 as the first level zones 420 and 440—in other words, the "10" from the geo-marker of the second level zone 530 is the encoded geographic association between the first level zone 430 that includes the second level zone 530 and the first level zones 410, 420 and 440.

Therefore, based on the "01" from the geo-marker of the first level zone 420 and the "10" from the geo-marker of the second level zone 530, the server 112 may be configured to determine that the first level zone 420 is (i) located along the North-East direction from the second level zone 530, but (ii) not at least partially aligned with the second level zone 530 in the North direction. Also, based on the "11" from the geo-marker of the first level zone 440 and the "10" from the geo-marker of the second level zone 530, the server 112 may be configured to determine that the first level zone 440 is located along the East direction from the second level zone 530 and/or not located along the North direction from the second level zone 530 and (ii) not at least partially aligned with the second level zone 530 in the North direction. As a result, the server 112 does not identify the first level zones 420 and 440 as respective ones of the other target zones.

It should be recalled that the geo-markers of the first level zones 410 is "XXX00", while the geo-marker of the second level zone 530 is "XXX1010". In this case, the server 112 may be configured to compare the values of the last two digits of the geo-marker of the first level zone 410 against the values of the two digits preceding the last two digits of the geo-marker of the second level zone 530. In other words, the server 112 may compare "00" from the geo-marker of the first level zone 410 against "10" from the geo-marker of the second level zone 530.

Similarly to what has been described above during the comparison of the geo-markers of the first level zones 420 and 440 against the geo-marker of the second level zone 530, based on the "00" from the geo-marker of the first level zone 410 and the "10" from the geo-marker of the second level zone 530, the server 112 may be configured to determine that the first level zone 410 is (i) located along the North direction from the second level zone 530, and (ii) at least partially aligned with the second level zone 530 in the North direction. As a result, the server 112 identifies the first level zone 410 as one of the other target zones.

In a sixth instance, as explained above, since the node of the first level zone 410, which is one of the other target zones, has respective child nodes, the server 112 may be configured to "go-down" in the tree-structure 700 from the node of the first level zone 410 to the respective child nodes and execute the masking algorithm on the geo-markers of the respective child nodes. For example, the server 112 may be configured to "go-down" in the tree-structure 700 from the node of the first level zone 410 to the nodes of the second level zones 720 and 730 and execute the masking algorithm on the geo-markers of the nodes of the second level zones 720 and 730.

The server 112 may be configured to compare the geo-marker of the second level zone 530 against the geo-marker of the second level zone 720. It should be recalled that the geo-marker of the second level zone 720 is "XXX0001" and the geo-marker of the second level zone 530 is "XXX1010". Based on the two digits preceding the last two digits of each one of the geo-markers of the second level zone 720 and 530, which are respectively "00" and "10", the server 112 may be configured to determine that the parent zone of the second level zone 720 is located along the North direction from the parent zone of the second level zone 530. Also, based on the last two digits of each one of the geo-markers of the second level zone 720 and 530, which are respectively "01" and "10", the server 112 may determine that the second level zone 720 is a top right (North-East) zone in its parent zone while the second level zone 530 is a bottom left (South-West) zone in its parent zone. The server 112 may therefore determine that the second level zone 720 is (i) located along a North-East direction from the second level zone 530, but (ii) not at least partially aligned with the second level zone 530 in the North direction. As a result, the server 112 does not identify the second level zone 720 as one of the other target zones.

The server 112 may be configured to compare the geo-marker of the second level zone 530 against the geo-marker of the second level zone 730. It should be recalled that the geo-marker of the second level zone 730 is "XXX0010" and the geo-marker of the second level zone 530 is "XXX1010". Based on the two digits preceding the last two digits of each one of the geo-markers of the second level zone 730 and 530, which are respectively "00" and "10", the server 112 may be configured to determine that the parent zone of the second level zone 730 is located along the North direction from the parent zone of the second level zone 530. Also, based on the last two digits of each one of the geo-markers of the second level zone 730 and 530, which are respectively "10" and "10", the server 112 may determine that the second level zone 730 is a bottom left (South-West) zone in its parent zone and that the second level zone 530 is a bottom left (South-West) zone in its parent zone. The server 112 may therefore determine that the second level zone 730 is (i) located along the North direction from the second level zone 530 and (ii) is at least partially aligned with the second level zone 530 in the North direction. As a result, the server 112 identifies the second level zone 730 as one of the other target zones.

In summary, the server 112 is configured to execute the masking algorithm on the geo-markers associated with nodes of the tree-structure 700 in order to determine which nodes are associated with zones that are (i) at least partially located along the North direction from the second level zone 530 and (ii) at least partially aligned with the second level zone 530 in the North direction. Indeed, the server 112 by executing the masking algorithm may perform the logical analysis based on the geo-markers of nodes of the tree-structure 700 in order to determine that the other target zones are: the second level zone 510, the third level zone 620, the first level zone 430, the first level zone 410, the second level zone 730 and the reference zone 302.

It is contemplated that the server 112 may be configured to form a set of target zones (i) associated with the target point and the pre-determined direction on the map and (ii) based on the lowest level target zone and the other target zones. In this case, the server 112 may be configured to form the set of target zones that comprises: the second level zone 530, the second level zone 510, the third level zone 620, the first level zone 430, the first level zone 410, the second level zone 730 and the reference zone 302.

The server 112 may be configured to retrieve geo-data associated with the segments stored in the index 150 in association with nodes of each one of the set of target zones. In this case, the server 112 is configured to retrieve the geo-data associated with the segment I-J from the node associated with the second level zone 530, the segment K-L from the node associated with the second level zone 510, the segment L-M from the node associated with the third level zone 620, the segments H-I and J-K from the node associated with the first level zone 430, the segments O-P and P-Q from the node associated with the first level zone 410, the segment N-O from the node associated with the second level zone 730, and the segments A-B, D-E, F-G and M-N from the root node associated with the reference zone 302.

The server 112 is then configured to generate the set of target segments by grouping the segments from the set of target zones that are associated with the polygon 300. In this case, all the segments retrieved from the nodes associated with each one of the set of target zones are associated with the polygon 300. However, it should be understood that this may not be the case in other implementations of the present technology where segments of other potential polygons are stored in the index 150.

It should be noted that in this case, the set of target segments comprises the segments I-J, K-L, L-M, H-I, J-K, O-P, P-Q, N-O, A-B, D-E, F-G and M-N from the totality of segments of the polygon 300. In other words, the set of target segments does not include the segments Q-A, B-C, C-D, G-H and E-F from the totality of segments of the polygon 300. Hence, as mentioned above, the set of target segments comprises a number of segments of the polygon 300 that is smaller than a total number of segments of the polygon 300.

The server 112 may also be configured to geometrically determine a number of target segments from the set of target segments that intersect the ray 880. It is contemplated that since the number of segments in the set of target segments is smaller than the total number of segments of the polygon 300, geometrically determining how many target segments from the set of target segments intersect the ray 800 requires less processing power and time than geometrically determining how many segments from all the segments of the polygon 300 intersect the ray 800. Thus, it can be said that, by generating the set of target segments as explained above, the server 112 is configured to determine a sub-set of segments of the polygon 300 that may be potentially intersected by the ray 880 and that it smaller than the complete set of segments of the polygon 300.

The server 112 may be configured to geometrically determine whether a given target segment from the set of target segments intersects the ray 880 based on the geo-data of the given target segments and the geo-data of the ray 880.

As explained above, responsive to geometrically determining that an even number of target segments intersect the ray 880, the server 112 is configured to determine that the location 850 of the target point is outside the polygon 300 and therefore, outside the park 202. On the other hand, responsive to geometrically determining that an odd number of target segments intersect the ray 880, the server 112 is configured to determine that the location 850 of the target point is inside the polygon 300 and, therefore, inside the park 202.

Let it be assumed that the server 112 determines that the location 850 of the target point is inside the park 202. As a result, the server 112 may be configured to generate the response 166 containing region-specific data associated with the park 202, and send it to the device 102 for display to the user 104 via the output device 103.

Figure 9:
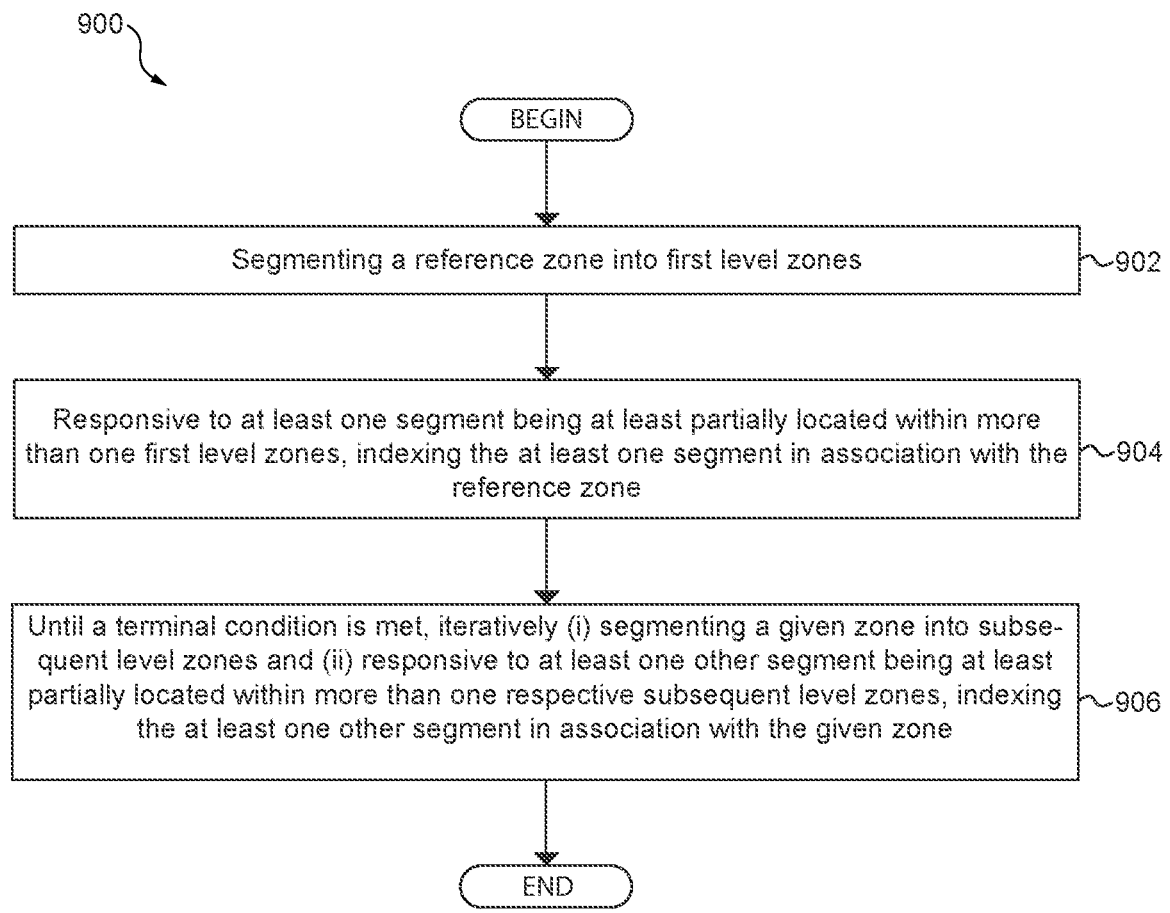
FIG. 9 depicts a block diagram of a method, the method being executable within the system of FIG. 1 and being implemented in accordance with non-limiting embodiments of the present technology.

In some embodiments of the present technology, the server 112 may be configured to execute a method 900 for generating the index 150. For example, the server 112 may be configured to execute the method 900 for indexing the totality of segments of the polygon 300 and of other potential polygons. Various steps of the method 900 will now be described with reference to FIG. 9.

Step 902: Segmenting a Reference Zone in to First Level Zones

The method 900 begins at step 902, with the server 112 being configured to segment the reference zone 302 at the reference level 450 into the first level zones 410, 420, 430 and 440 at the first level 460, as seen in FIG. 4. The reference zone 302 covers a portion of the map which encloses all segments of the polygon 300. In other embodiments of the present technology, a given reference zone may cover the entirety of the map. The reference zone 302 is the parent zone of the first level zones 410, 420, 430 and 440.

The first level zones 410, 420, 430 and 440 are depicted as four square-shaped zones. However, it should be understood that a number and a shape of the first level zones 410, 420, 430 and 440 may depend on inter alia the shape of the respective reference zone 302, a number of segmenting lines determined by the server 112 and/or various implementations of the present technology. The first level zones 410, 420, 430 and 440 are depicted as being equal or, in other words, enclose equal areas of the reference zone 302. However, the first level zones 410, 420, 430 and 440 may enclose unequal areas of the reference zone 302 in other implementations without departing from the scope of the present technology.

In the non-limiting embodiment of FIG. 4, once the segmenting lines 402 and 404 are determined, they are used by the server 112 in order to, in a sense, "tessellate" the reference zone 302 into the plurality of equal and contiguous square-shaped cells or quadrants (the first level zones 410, 420, 430 and 440) that form the grid for the reference zone 302.

Step 904: Responsive to at Least One Segment being at Least Partially Located within More than One First Level Zones, Indexing the at Least One Segment in Association with the Reference Zone The method 900 continues to step 904 with the server 112 being configured to, responsive to at least one segment of the polygon 300 being at least partially located within more than one first level zones 410, 420, 430 and 440, indexing the at least one segment in association with the reference zone 302.

In other words, once the reference zone 302 is segmented following the execution of the step 902, the server 112 is configured to identify segments of the polygon 300 (and of other potential polygons) that are located at least partially in more than one of the first level zones 410, 420, 430 and 440 (e.g., more than one quadrant of the grid of the reference zone 302). In other words, the server 112 may be configured to identify segments of the polygon 300 which intersect at least one of the segmenting lines 402 and 404 used to segment the reference zone 302.

In the example of FIG. 4, the server 112 identifies the segments A-B, D-E, F-G and M-N as located at least partially in more than one of the first level zones 410, 420, 430 and 440. So-identified segments A-B, D-E, F-G and M-N are to be indexed by the server 112 in association with the reference zone 302.

It is contemplated that the server 112, for indexing the segments A-B, D-E, F-G and M-N, is configured to store geo-data associated with the segments A-B, D-E, F-G and M-N in association with the reference zone 302 in the database 114.

In some embodiments, where a given reference zone covers the entirety of the map, the server 112 may be configured to store geo-data associated with given segments in association with any suitable marker indicative of that the location of the given reference zone corresponds to the entire map.

In other embodiments, where a given reference zone covers only partially the map, such as the reference zone 302, the server 112 is configured to generate the geo-marker for the reference zone 302 and store the geo-data associated with given segments in association with the geo-marker of the reference zone 302.

It is contemplated that the generation of the geo-marker for the reference zone 302 may be executed by the server 112 via the geo-hashing algorithm implemented by the server 112. As explained above, the server 112 may employ the geo-hashing algorithm for encoding the location of the reference zone 302 as "XXX" on the map or by any other suitable geo-hashed string.

In some embodiments, with reference to FIG. 7, the server 112 may be configured to generate, for the reference zone 302, the root node at the reference level 450 of the tree-structure 700 and store the geo-data of the segments A-B, D-E, F-G and M-N in association with this root node. For example, since the reference zone 302 covers only partially the map, the root node may be generated in association with the geo-marker "XXX" of the reference zone 302.

In some embodiments of the present technology, execution of the step 904 of the method 900 by the server 112 culminates with the generation the root node of the tree-structure 700 and where the geo-data of the segments A-B, D-E, F-G and M-N is stored.

Once the segments A-B, D-E, F-G and M-N are indexed as explained above, the server 112 may be configured to continue building the index 150 for indexing other segments of the polygon 300 (other than the segments A-B, D-E, F-G and M-N, since they are already indexed) in association with zones other than the reference zone 302.

Step 906: Until a Terminal Condition is Met, Iteratively (i) Segmenting a Given Zone at a into Subsequent Level Zones and (ii) Responsive to at Least One Other Segment being at Least Partially Located within More than One Respective Subsequent Level Zones, Indexing the at Least One Other Segment in Association with the Given Zone The method 900 continues to step 906 that can be iteratively repeated by the server 112 at least until the terminal condition is met.

As part of the step 906, the server 112 is configured to (i) segment a given zone at a given level into subsequent level zones at a subsequent level, such that the given zone is a parent zone to the respective subsequent level zones, and (ii) responsive to at least one other segment being at least partially located within more than one respective subsequent level zones, index the at least one other segment in association with the given zone.

For example, a first iteration of the step 906 is executed on the first level zone 430 with reference to FIG. 5. In this example, the server 112 segments the first level zone 430 at the first level 460 into the second level zones 510, 520, 530 and 540 at the second level 470, such that the first level zone 430 is the parent zone to the second level zones 510, 520, 530 and 540. In this example, responsive to the segments H-I and J-K being at least partially located within more than one respective second level zones 510, 520, 530 and 540, the server 112 indexes the segments H-I and J-K in association with the first level zone 430.

In another example a second iteration of the step 906 is executed on the second level zone 510 with reference to FIG. 6. In this example, the server 112 segments the second level zone 510 at the second level 470 into the third level zones 610, 620, 630 and 640 at the third level 480, such that the second level zone 510 is the parent zone to the third level zones 610, 620, 630 and 640. In this example, responsive to the segment K-L being at least partially located within more than one respective third level zones 610, 620, 630 and 640, the server 112 indexes the segment K-L in association with the second level zone 510.

It is contemplated that, during a given iteration of the step 906, in order to index the at least one other segment in association with the given zone, the server 112 is configured to (i) generate a geo-marker for the given zone which is indicative of a location of the given zone in a respective parent zone and of a geographic association between the given zone and other child zones of the respective parent zone, and (ii) store data about the at least one other segment in association with the geo-marker of the given zone.

For example, during the first iteration of the step 906, the server 112 is configured to generate the geo-marker "XXX10" for the first level zone 430.

In some embodiments of the present technology, in order to generate the geo-marker for the first level zone 430, the server 112 may be configured to: (i) encode a geographic association between the first level zone 430 and the first level zones 410, 420 and 440, and (ii) if a geo-marker has been generated for the parent zone (in this case the reference zone 302), generate the geo-marker by appending the geo-marker of the parent zone with the respective encoded geographic association.

Let it be assumed, as mentioned above, that the geo-maker "XXX" has been generated for the reference zone 302. As such, the server 112 may generate the geo-marker for the first level zone 430 by (i) encoding the geographic association between the first level zone 430 and the first level zones 410, 420 and 440 and (ii) appending the respective encoded geographic association to the geo-marker "XXX".

The geographic association between the first level zone 430 and the first level zones 410, 420 and 440 may be encoded in different ways. In one embodiment, the server 112 may be configured to employ the Z-order encoding as part of the hashing algorithm, as explained above. For example, the server 112 may employ the Z-order encoding as part of the hashing algorithm for generating the encoded geographic association "10" for the first level zone 430, since the first level zone 430 is a bottom left (South-West) quadrant of the grid of the reference zone 302.

It should be mentioned that the geo-marker for the first level zone 430 is indicative of (i) the location of the first level zone 430 in the parent zone being the reference zone 302, and (ii) the geographic association between the first level zone 430 and the first level zones 410, 420 and 440.

In this case, the encoded geographic association "10" for the first level zone 430 comprises two digits, where (i) the first digit having the value of "1" indicates that the first level zone 430 is one of the bottom (South) first level zones in the reference zone 302, and (ii) the second digit having the value of "0" indicates that the first level zone 430 is one of the left (West) first level zones in the reference zone 302. Therefore, the combination of the two digits having the values "1" and "0", respectively, indicates that the first level zone 430 is the bottom left (South-West) first level zone amongst the first level zones 410, 420, 430 and 440 in the reference zone 302.

However, it should be understood that, in other embodiments of the present technology, the server 112 may be configured to employ any other suitable encoding method for encoding the geographic association between a given one of the first level zones 410, 420, 430 and 440 and the other ones of the first level zones 410, 420, 430 and 440, without departing from the scope of the present technology.

In another example, during the second iteration of the step 906, the server 112 is configured to generate the geo-marker "XXX1000" for the second level zone 510. The server 112 may be configured to generate the geo-marker "XXX1000" for the second level zone 510 similarly to how the server 112 is configured to generate the geo-marker "XXX10" for the first level zone 430, without departing from the scope of the present technology.

As mentioned above, the step 906 of the method 900 may be iteratively repeated by the server 112 at least until the terminal condition is met. It is contemplated that the terminal condition may be based on at least one of: (i) the number of pixels enclosed in at least one lowest level zone, and (ii) the number of segments located entirely in the at least one lowest level zone.

For example, the terminal condition may be met responsive to the server 112 determining that at least one of: (i) the number of pixels enclosed in at least one lowest level zone is below a pre-determined minimum number of pixels to be enclosed in the at least one lowest level zone, and (ii) the number of segments located entirely in the at least one lowest level zone is below a pre-determined minimum number of segments to be located entirely in the at least one lowest level zone.

The pre-determined minimum number of pixels to be enclosed in the at least one lowest level zone and/or the pre-determined minimum number of segments to be located entirely in the at least one lowest level zone may be determined by an operator of the server 112. For example, the operator of the server 112 may determine the pre-determined minimum number of pixels to be enclosed in the at least one lowest level zone and/or the pre-determined minimum number of segments to be located entirely in the at least one lowest level zone in order to control a size of a given tree-structure to be generated as a result of the process of building the index 150.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating an index of segments of at least one polygon defining a boundary of a respective geographic area on a map, the method executable by an electronic device, the electronic device having access to a database for hosting the index, the method comprising:
  segmenting, by the electronic device, a reference zone at a reference level into first level zones at a first level, the reference zone covering at least a portion of the map which encloses all segments of the at least one polygon, the reference zone being a parent zone to the first level zones;
  responsive to at least one segment being at least partially located within more than one first level zones, indexing, by the electronic device, the at least one segment in association with the reference zone, the indexing comprising:
    storing, by the electronic device, data about the at least one segment in association with the reference zone;
  such that segments located within only one first level zone are indexed in association with zones other than the reference zone;
  until a terminal condition is met, iteratively:
    segmenting, by the electronic device, a given zone at a given level into subsequent level zones at a subsequent level, the given zone being a parent zone to the respective subsequent level zones; and
    responsive to at least one other segment being at least partially located within more than one respective subsequent level zones, indexing, by the electronic device, the at least one other segment in association with the given zone, the indexing comprising:
      generating, by the electronic device, a geo-marker for the given zone, the geo-marker being indicative of (i) a location of the given zone in a respective parent zone, the respective parent zone of the given zone being at a preceding level to the given level, and (ii) a geographic association between the given zone and other child zones of the respective parent zone; and
      storing, by the electronic device, data about the at least one other segment in association with the geo-marker of the given zone;
  such that segments located within only one respective subsequent level zone are indexed in association with child zones of a respective one of the only one subsequent level zone.

2. The method of claim 1, wherein in response to the terminal condition being met, the method further comprises:
  indexing, by the electronic device, the segments located within the only one respective subsequent level zone in association with the only one respective subsequent level zone.

3. The method of claim 1, wherein the terminal condition is met when at least one of:
  a number of pixels included in at least one lowest level zone is below a pre-determined minimum number of pixels to be enclosed in the at least one lowest level zone; and
  a number of segments located entirely in the at least one lowest level zone is below a pre-determined minimum number of segments to be located entirely in the at least one lowest level zone.

4. The method of claim 1, wherein the method further comprises:
  receiving, by the electronic device, an indication of a location of a target point on the map;
  accessing, by the electronic device, the index to determine:
    a lowest level target zone corresponding to the location of the target point based on geo-markers of zones in the index, and
    other target zones being (i) at least partially located along a pre-determined direction on the map from the lowest level target zone and (ii) at least partially aligned with the lowest level target zone in the pre-determined direction, based on the geo-markers of zones stored in the index, the pre-determined direction having been determined based on a geographic association between child zones of a given parent zone;

such that the lowest level target zone and the other target zones form a set of target zones associated with the target point and the pre-determined direction on the map.

5. The method of claim 4, wherein the accessing the index to determine the other target zones comprises:

executing, by the electronic device, a masking algorithm on the geo-markers of zones stored in the index, the masking algorithm having been configured:

based on the geographic association between child zones of a given parent zone;

for determining whether a given zone is at least partially located from another given zone in the pre-determined direction and whether the given zone is at least partially aligned with the another given zone in the pre-determined direction, based on geo-markers of the given zone and the another given zone.

6. The method of claim 4, wherein the method further comprises:

determining, by the electronic device, whether the target point is within a given geographic area, the boundary of the given geographic area corresponding to a given polygon from the at least one polygon, the determining comprises:

generating, by the electronic device, a set of target segments by grouping the data about segments that are both:

stored in the index in association with the set of target zones; and associated with the given polygon;

geometrically determining, by the electronic device, a number of target segments in the set of target segments that intersect a ray projecting from the location of the target point along the pre-determined direction on the map, such that:

responsive to geometrically determining that an even number of target segments intersect the ray, determining, by the electronic device, that the target point is outside the given geographic area; and responsive to geometrically determining that an odd number of target segments intersect the ray, determining, by the electronic device, that the target point is inside the given geographic area.

7. The method of claim 4, wherein the map is displayable on a screen connectable to an electronic device associated with a user and wherein the receiving, by the electronic device, the indication of the location of the target point on the map comprises receiving an indication of a user interaction of a portion of the map.

8. The method of claim 7, wherein the user interaction is one of a click and touch on a touch screen.

9. The method of claim 1, wherein the generating the geo-marker comprises employing, by the electronic device, a geo-hashing algorithm.

10. The method of claim 9, wherein the employing the geo-hashing algorithm comprises employing, by the electronic device, a Z-order encoding for encoding the geographic association for the respective zone.

11. An electronic device for generating an index of segments of at least one polygon defining a boundary of a respective geographic area on a map, the electronic device having access to a database for hosting the index, the electronic device being configured to:

segment a reference zone at a reference level into first level zones at a first level, the reference zone covering at least a portion of the map which encloses all segments of the at least one polygon, the reference zone being a parent zone to the first level zones;

responsive to at least one segment being at least partially located within more than one first level zones, index the at least one segment in association with the reference zone, the electronic device being configured to index comprising the electronic device being configured to:

store data about the at least one segment in association with the reference zone;

such that segments located within only one first level zone are indexed in association with zones other than the reference zone;

until a terminal condition is met, iteratively:

segment a given zone at a given level into subsequent level zones at a subsequent level, the given zone being a parent zone to the respective subsequent level zones; and responsive to at least one other segment being at least partially located within more than one respective subsequent level zones, index the at least one other segment in association with the given zone, the electronic device being configured to index comprising the electronic device being configured to:

generate a geo-marker for the given zone, the geo-marker being indicative of (i) a location of the given zone in a respective parent zone, the respective parent zone of the given zone being at a preceding level to the given level, and (ii) a geographic association between the given zone and other child zones of the respective parent zone; and store data about the at least one other segment in association with the geo-marker of the given zone;

such that segments located within only one respective subsequent level zone are indexed in association with child zones of a respective one of the only one subsequent level zone.

12. The electronic device of claim 11, wherein in response to the terminal condition being met, the electronic device is further configured to:

index the segments located within the only one respective subsequent level zone in association with the only one respective subsequent level zone.

13. The electronic device of claim 11, wherein the terminal condition is met when at least one of:

a number of pixels included in at least one lowest level zone is below a pre-determined minimum number of pixels to be enclosed in the at least one lowest level zone; and a number of segments located entirely in the at least one lowest level zone is below a pre-determined minimum number of segments to be located entirely in the at least one lowest level zone.

14. The electronic device of claim 11, wherein the electronic device is further configured to:

receive an indication of a location of a target point on the map;

access the index to determine:

a lowest level target zone corresponding to the location of the target point based on geo-markers of zones in the index; and other target zones being (i) at least partially located along a pre-determined direction on the map from the lowest level target zone and (ii) at least partially aligned with the lowest level target zone in the pre-determined direction, based on the geo-markers of zones stored in the index,
the pre-determined direction having been determined based on a geographic association between child zones of a given parent zone;
such that the lowest level target zone and the other target zones form a set of target zones associated with the target point and the pre-determined direction on the map.

15. The electronic device of claim 14, wherein to access the index to determine the other target zones comprises the electronic device being configured to:
execute a masking algorithm on the geo-markers of zones stored in the index, the masking algorithm having been configured:
based on the geographic association between child zones of a given parent zone;
for determining whether a given zone is at least partially located from another given zone in the pre-determined direction and whether the given zone is at least partially aligned with the another given zone in the pre-determined direction, based on geo-markers of the given zone and the another given zone.

16. The electronic device of claim 14, wherein the electronic device is further configured to:
determine whether the target point is within a given geographic area, the boundary of the given geographic area corresponding to a given polygon from the at least one polygon, to determine comprising the electronic device being configured to:
generate a set of target segments by grouping the data about segments that are both:
stored in the index in association with the set of target zones; and
associated with the given polygon;
geometrically determine a number of target segments in the set of target segments that intersect a ray projecting from the location of the target point along the pre-determined direction on the map, such that:
responsive to geometrically determining that an even number of target segments intersect the ray, the electronic device is configured to determine that the target point is outside the given geographic area; and
responsive to geometrically determining that an odd number of target segments intersect the ray, the electronic device is configured to determine that the target point is inside the given geographic area.

17. The electronic device of claim 14, wherein the map is displayable on a screen connectable to the electronic device and wherein to receive the indication of the location of the target point on the map comprises the electronic device being configured to receive an indication of a user interaction of a portion of the map.

18. The electronic device of claim 17, wherein the user interaction is one of a click and touch on a touch screen.

19. The electronic device of claim 11, wherein to generate the geo-marker comprises the electronic device being configured to employ a geo-hashing algorithm.

20. The electronic device of claim 19, wherein to employ the geo-hashing algorithm comprises the electronic device being configured to employ a Z-order encoding for encoding the geographic association for the respective zone.

* * * * *